United States Patent
Uchiyama

(10) Patent No.: US 6,909,212 B2
(45) Date of Patent: Jun. 21, 2005

(54) MOTOR HAVING ROTATION SENSOR AND MANUFACTURING METHOD THEREOF

(75) Inventor: Haruhiko Uchiyama, Kosai (JP)

(73) Assignee: Asmo Co., Ltd., Shizuoka-Pref (JP)

( * ) Notice: Subject to any disclaimer, the term of this patent is extended or adjusted under 35 U.S.C. 154(b) by 0 days.

(21) Appl. No.: 10/784,923

(22) Filed: Feb. 24, 2004

(65) Prior Publication Data

US 2004/0212261 A1 Oct. 28, 2004

(30) Foreign Application Priority Data

Feb. 27, 2003 (JP) .................................... 2003-050381

(51) Int. Cl.$^7$ .............................................. G01D 5/36
(52) U.S. Cl. ................................................ 310/68 B
(58) Field of Search .................... 310/68 B; 250/231.13

(56) References Cited

U.S. PATENT DOCUMENTS

| | | | | |
|---|---|---|---|---|
| 4,020,912 A | * | 5/1977 | Hino et al. .................. 177/178 |
| 4,184,071 A | * | 1/1980 | Fryer et al. ............. 250/231.16 |
| 4,899,048 A | * | 2/1990 | Shelander .............. 250/231.14 |
| 5,103,225 A | * | 4/1992 | Dolan et al. ................... 341/13 |
| 5,519,393 A | * | 5/1996 | Brandestini ................... 341/10 |
| 5,783,924 A | * | 7/1998 | Kahlman ..................... 318/601 |
| 5,866,962 A | * | 2/1999 | Kim ......................... 310/68 B |
| 5,880,683 A | * | 3/1999 | Brandestini ................... 341/10 |
| 6,191,415 B1 | * | 2/2001 | Stridsberg .............. 250/231.13 |
| 6,194,709 B1 | * | 2/2001 | Briggs et al. ........... 250/231.14 |
| 6,304,014 B1 | * | 10/2001 | England et al. ........... 310/68 B |
| 6,420,807 B1 | | 7/2002 | Tsujimoto et al. |
| 2002/0163266 A1 | | 11/2002 | Tsujimoto et al. |

FOREIGN PATENT DOCUMENTS

| | | | |
|---|---|---|---|
| DE | 3818994 A1 | * | 12/1988 |
| JP | 62191716 A | * | 8/1987 |
| JP | A-11-122887 | | 4/1999 |
| JP | A-2002-78290 | | 3/2002 |

* cited by examiner

*Primary Examiner*—Joseph Waks
(74) *Attorney, Agent, or Firm*—Posz Law Group, PLC

(57) ABSTRACT

A circuit board includes rotation sensors, each of which outputs a signal that corresponds to a rotational speed of a sensor plate secured to an output shaft. Each rotation sensor includes two opposed arms, which are spaced from each other in a direction parallel to an axial direction of the output shaft and receives a portion of the sensor plate between the opposed arms. The circuit board has a through hole or recess, which penetrates through the circuit board in the axial direction of the output shaft to receive a tubular portion of a stator base and which is elongated in a direction perpendicular to the axial direction of the output shaft.

20 Claims, 21 Drawing Sheets

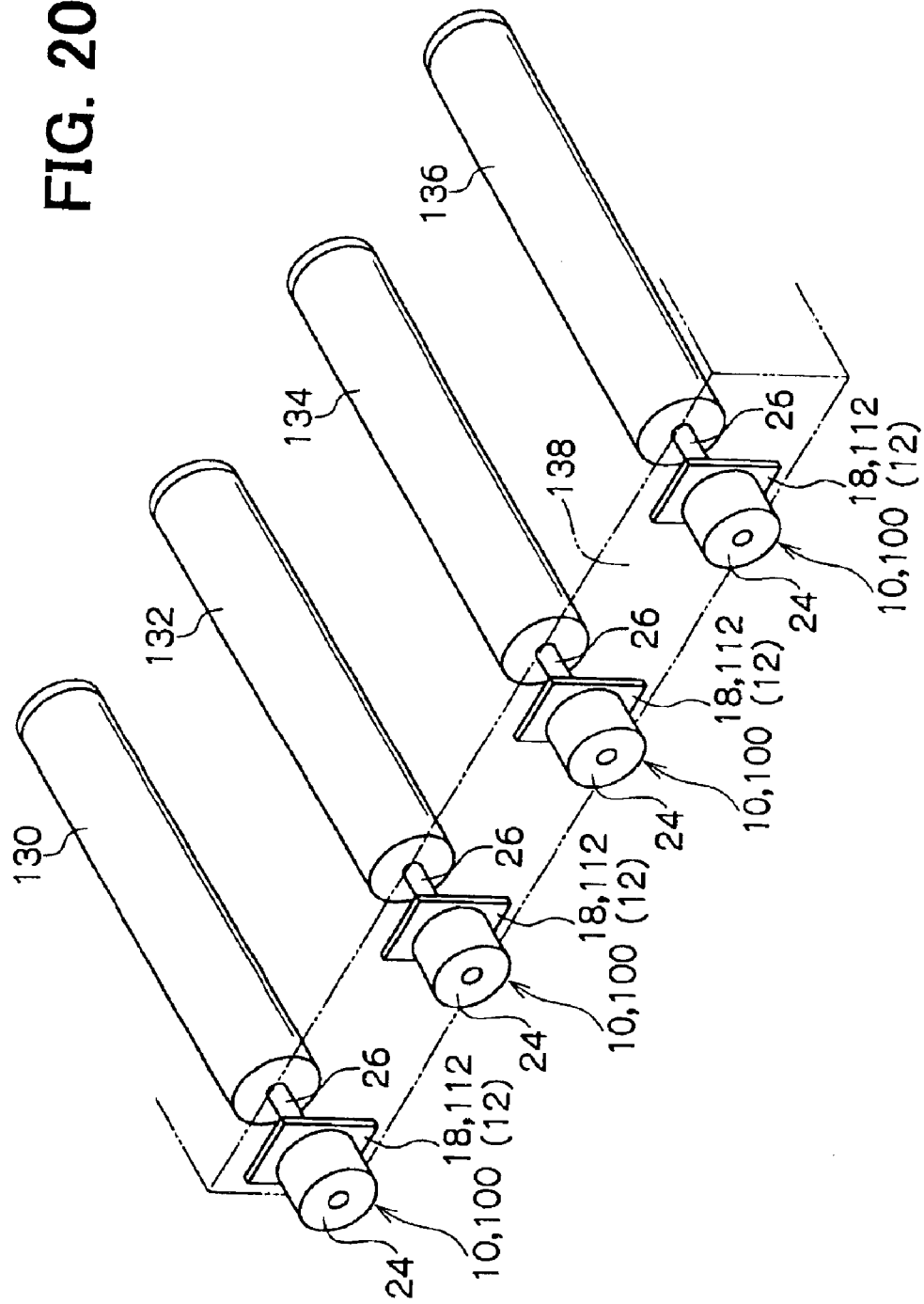

MOTOR HAVING ROTATION SENSOR AND MANUFACTURING METHOD THEREOF

CROSS REFERENCE TO RELATED APPLICATION

This application is based on and incorporates herein by reference Japanese Patent Application No. 2003-50381 filed on Feb. 27, 2003.

BACKGROUND OF THE INVENTION

1. Field of the Invention

The present invention relates to an electric motor having one or more rotation sensors, each of which outputs a signal that corresponds to a rotational speed of an output shaft of the motor. The present invention further relates to a manufacturing method of such a motor.

2. Description of Related Art

In one previously proposed outer rotor motor, rotation sensors and a circuit board, which includes a control circuit, are secured to a stator. Each rotation sensor outputs a signal that corresponds to a rotational speed of an output shaft of the outer rotor motor. The control circuit controls the rotational speed of the output shaft, i.e., a pattern of power supply (hereinafter referred to as a power supply pattern) to coils of the stator based on the output signals of the rotation sensors.

One such an outer rotor motor will be described with reference to FIGS. 21A and 21B. FIG. 21A shows a partially fragmented front view of the outer rotor motor 200. FIG. 21 shows a cross sectional view of the outer rotor motor 200. The outer rotor motor 200 includes a stator, which has a stator base 202. The stator base 202 includes a tubular portion 204 and an extension 206. The extension 206 extends radially outwardly from a base end of the tubular portion 204 and has a square shape when the extension 206 is viewed in a direction perpendicular to a plane of the extension 206. A stator core 209, around which coils 208 are wound, is secured to an outer peripheral portion of the tubular portion 204.

Furthermore, an output shaft 210 is rotatably received in the tubular portion 204 through bearings 212. A rotor housing (yoke) 214 is coaxially secured to one end of the output shaft 210. Furthermore, magnets 216 are secured to an inner peripheral surface of the rotor housing 214, which surrounds a radially outer part of the stator core 209. With the above structure, when electrical power is supplied to the coils 208, the rotor housing 214 and the output shaft 201 are rotated together by magnetic force of the coils 208 and magnetic force of the magnets 216.

A sensor plate 218, which has a circular disc shape, is coaxially secured to the output shaft 210 at axially outward of the extension 206. The sensor plate 218 rotates with the output shaft 210. An outer peripheral portion of the sensor plate 218 includes a predetermined number of slits 218A, which are arranged at equal intervals in a circumferential direction of the sensor plate 218.

Two rotation sensors 220, 222 are arranged in a symmetrical manner with respect to the rotational axis of the sensor plate 218. Each rotation sensor 220, 222 has two opposed arms, so that the rotation sensor 220, 222 has a horseshoe-shaped cross section. A slit forming portion of the sensor plate 218, which has the slits 218A, is received between the arms of each rotation sensor 220, 222. A light emitting element is provided to one of the arms of each rotation sensor 220, 222, and a light receiving element is provided to the other one of the arms of the rotation sensor 220, 222. An on/off pulse signal is outputted depending on whether light emitted from the light emitting element is received by the light receiving element through a corresponding slit 218A. The outputted on/off signal (pulse width) corresponds to the rotational speed of the sensor plate 218.

The rotation sensor 220 is installed to a circuit board 224 that is secured to a circuit board holding portion 206A, which is recessed in the extension 206. The rotation sensor 222 is installed to a circuit board 226 that is secured to a circuit board holding portion 206B, which is recessed in the extension 206, separately from the circuit board 224. Each circuit board 224, 226, which includes the corresponding rotation sensor 220, 222, is slid relative to the corresponding circuit board holding portion 206A, 206B while a distal end of the rotation sensor 220, 222 is oriented toward the rotational axis of the sensor plate 218. Thus, the sensor plate 218 is received between the arms of the corresponding rotation sensor 220, 222. Each circuit board 224, 226 includes a connector 224A, 226A, through which output signals of the corresponding rotation sensor 220, 222 are outputted to a control circuit board 228.

The control circuit board 228 is formed into a square shape, which corresponds to the shape of the extension 206. The tubular portion 204 is received through a through hole 228A of the control circuit board 228, which is formed in a center of the control circuit board 228. The control circuit board 228 is secured to a stator core 209 side of the extension 206. This arrangement of the control circuit board 228 allows effective installation of a power supply circuit, which supplies electrical power to the coils 208, to the control circuit board 228 and also allows effective installation of a Hall element 230, which measures magnetic pole positions of the magnets 216, to the control circuit board 228.

The control circuit board 228 further includes a control circuit. The control circuit maintains the rotational speed of the sensor plate 218. i.e., the rotational speed of the output shaft 210 at a preset target speed by changing the power supply pattern to the coils 208 when an average value of rotational speed measurements of the rotation sensors 220, 222 obtained based on the output signals of the rotation sensors 220, 222 differs from the preset target speed. Thus, a portion of the circuit board 228, which extends outwardly from the extension 206, has a connector 232 that is connected to the connectors 224A, 226A and to the power supply source through connectorized cables (not shown).

Furthermore, the extension 206 has a cover 234, which covers the sensor plate 218 and the rotation sensors 220, 222 to limit intrusion of light and foreign particles or objects. With this arrangement, reading errors from the rotation sensors 220, 222 can be limited.

However, in the above outer rotor motor 200, the control circuit board 228, the circuit board 224 having the rotation sensor 220, and the circuit board 226 having the rotation sensor 222 are separately provided. Thus, the number of components and the number of assembling steps are disadvantageously increased, resulting in an increase in manufacturing costs. Furthermore, each circuit board 224, 226, 228 needs to have the connector 224A, 226A, 232, and electrical connections between the circuit boards 224, 226, 228. Thus, the number of the components and the number of the assembling steps are disadvantageously increased. Particularly, in the case of the outer rotor motor 200, which includes the two rotation sensors 220, 222, the above disadvantages need to be considered.

In attempts to integrate the circuit boards 224, 226, 228 into a single circuit board having, for example, the control circuit and the rotation sensor 220, it is difficult to have a sufficient circuit board surface area for installing the control circuit while limiting a size of an overhang from the extension 206 (rotor housing 214), and also it is difficult to insert the sensor plate 218 between the two arms (i.e., portions that limit axial movement of the sensor plate) of, for example, the rotation sensor 220 installed in the circuit board.

Besides the above outer rotor motor 200, there are other previously proposed outer rotor motors. For example, Japanese Unexamined patent Publication No. 2000-346144 does not disclose a circuit board, to which a rotation sensor is installed, but discloses the rotation sensor and a control circuit board, which are separately provided. The separation of the rotation sensor and the control circuit board is similar to the outer rotor motor 200, and thereby the number of the components is still large. Thus, it is difficult to reduce manufacturing costs. Japanese Unexamined Patent Publication No. 2002-78290 discloses a motor but does not disclose a control circuit board provided in the motor. However, in Japanese Unexamined Patent Publication No. 2002-78290, a rotation sensor is independent from a controller. This feature is similar to the outer rotor motor 200 and thus results in the relatively large number of the components and the relatively high manufacturing costs. Japanese Unexamined Patent Publication No. 11-122887 discloses a rotation sensor unit, which is installed to a motor in a later process. This also results in a relatively large number of the components and the relatively high manufacturing costs.

SUMMARY OF THE INVENTION

The present invention addresses the above disadvantages. Thus, it is an objective of the present invention to provide an electric motor, which has a circuit board having one or more rotation sensors and a relatively large surface area for accommodating electrical components and which has a sensor plate received between arms of each rotation sensor at the time of installing the circuit board to a stator. It is another objective of the present invention to provide a manufacturing method of such a motor.

To achieve the objectives of the present invention, there is provided an electric motor that includes a rotor, an output shaft, a circular sensor plate, a stator and a circuit board. The rotor is rotated upon energization of the electric motor. The output shaft is secured to the rotor to rotate integrally with the rotor. The sensor plate is secured to the output shaft to rotate integrally with the output shaft. The stator has a stator base, which includes a tubular portion, wherein the tubular portion has a shaft hole, and the shaft hole penetrates through the tubular portion in an axial direction of the output shaft and rotatably receives the output shaft. The circuit board is secured to the stator base and includes at least one rotation sensor, which outputs a signal that corresponds to a rotational speed of the sensor plate. Each rotation sensor includes two opposed arms, which are spaced from each other in a direction parallel to the axial direction of the output shaft and receives a portion of the sensor plate between the opposed arms. The circuit board has a tubular portion receiving opening, which penetrates through the circuit board in the axial direction of the output shaft to receive the tubular portion of the stator base and which is elongated in a direction perpendicular to the axial direction of the output shaft, so that at least a portion of an inner peripheral edge of the tubular portion receiving opening is spaced away from the tubular portion.

To achieve the objectives of the present invention, there is also provided an electric motor that includes a rotor, an output shaft, a circular sensor plate, a circuit board and a stator. The rotor is rotated upon energization of the electric motor. The output shaft is secured to the rotor to rotate integrally with the rotor. The sensor plate is secured to the output shaft to rotate integrally with the output shaft. The circuit board includes at least one rotation sensor, which outputs a signal that corresponds to a rotational speed of the sensor plate. Each rotation sensor includes two opposed arms, which are spaced from each other in a direction parallel to an axial direction of the output shaft and receives a portion of the sensor plate between the opposed arms. The stator has a base plate, which extends in a direction perpendicular to the axial direction of the output shaft. The base plate includes at least one sensor receiving opening and a shaft hole. Each sensor receiving opening penetrates through the base plate from a first side to a second side of the base plate in a direction parallel to the axial direction of the output shaft to receive a corresponding one of the at least one rotation sensor. The shaft hole penetrates through the base plate in the axial direction of the output shaft and rotatably receives the output shaft. The circuit board is located on the first side of the base plate. The sensor plate is located on the second side of the base plate. Each rotation sensor protrudes from the corresponding sensor receiving opening on the second side of the base plate to receive the portion of the sensor plate between the opposed arms of the rotation sensor.

To achieve the objectives of the present invention, there is also provided a manufacturing method of an electric motor. According to the method, an output shaft, to which a circular sensor plate is secured, is installed into a shaft hole of a tubular portion of a stator base. A circuit board, which has at least one rotation sensor and an elongated tubular portion receiving opening, is installed to the stator base in an axial direction of the output shaft, so that the tubular portion of the stator base is received in the tubular portion receiving opening of the circuit board, and the circuit board is positioned in a non-interfering position. The circuit board is then moved to an installation position toward the output shaft in an imaginary plane perpendicular to the axial direction of the output shaft, so that a portion of the sensor plate is received between two opposed arms of each of the at least one rotation sensor.

BRIEF DESCRIPTION OF THE DRAWINGS

The invention, together with additional objectives, features and advantages thereof, will be best understood from the following description, the appended claims and the accompanying drawings in which:

FIG. 20 is a schematic perspective view showing application of the outer rotor motor of each embodiment to an image processing apparatus;

DETAILED DESCRIPTION OF THE INVENTION (First Embodiment)

An electric outer rotor motor 10 according to a first embodiment of the present invention will be described with reference to FIGS. 1–11.

Figure 1:
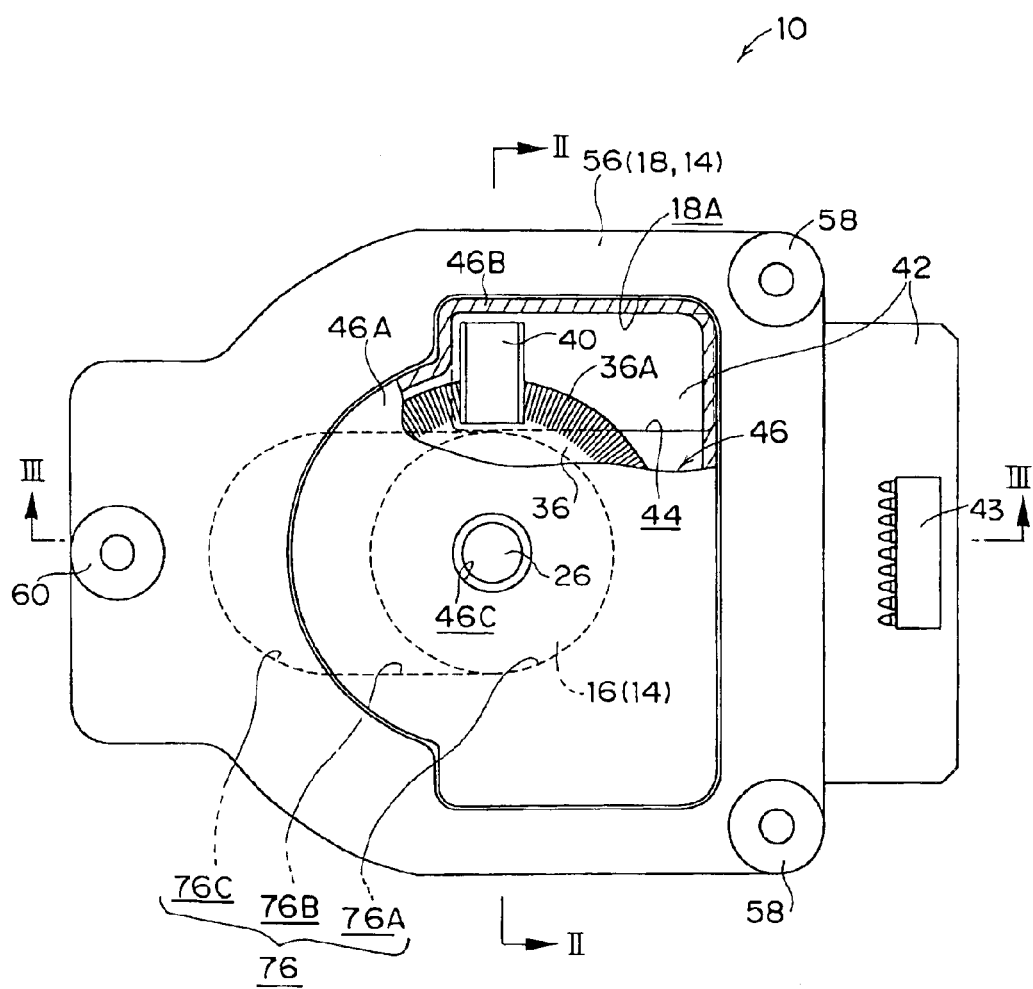
FIG. 1 is a partially fragmented front view of an outer rotor motor according to a first embodiment of the present invention.
Figure 2:
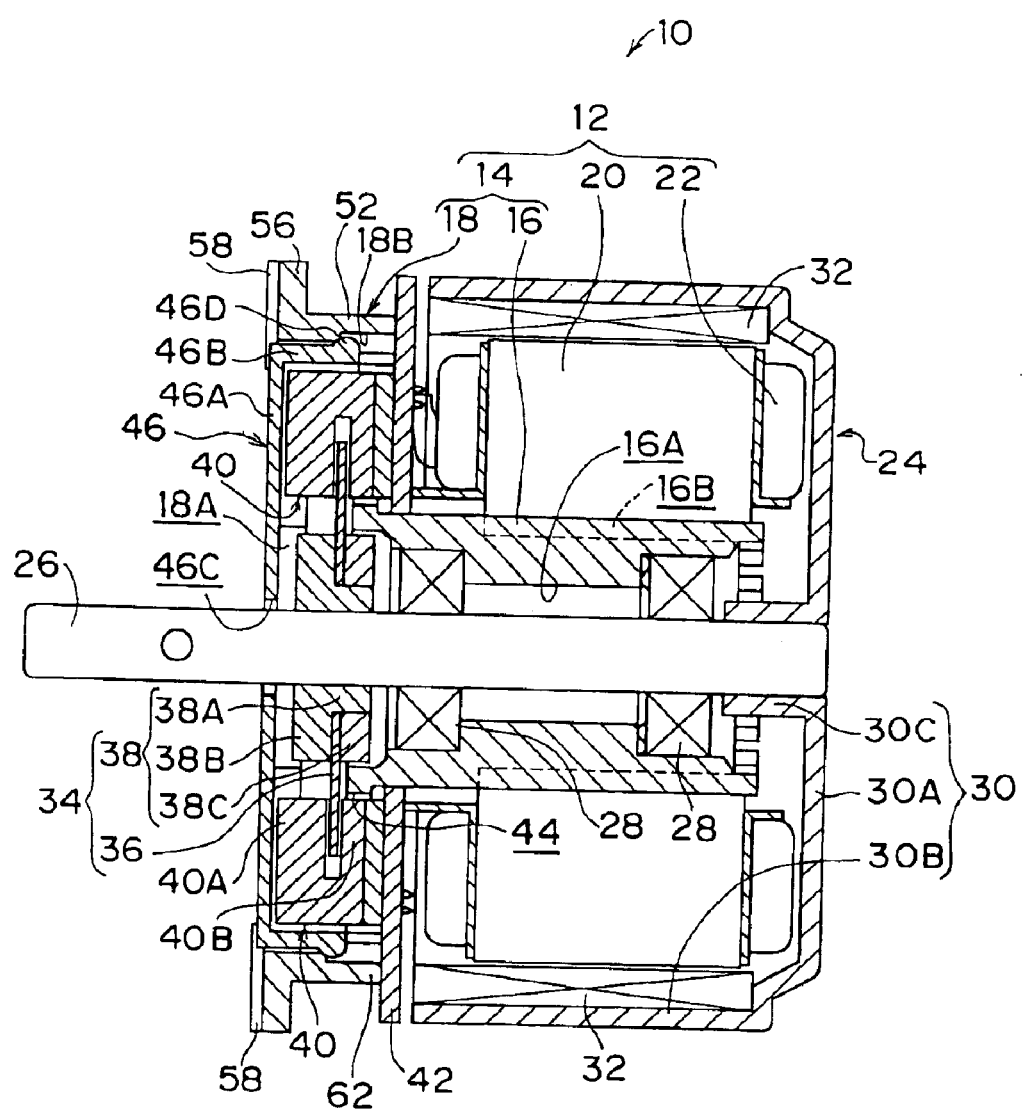
FIG. 2 is a cross sectional view along line II—II in FIG. 1.
Figure 3:
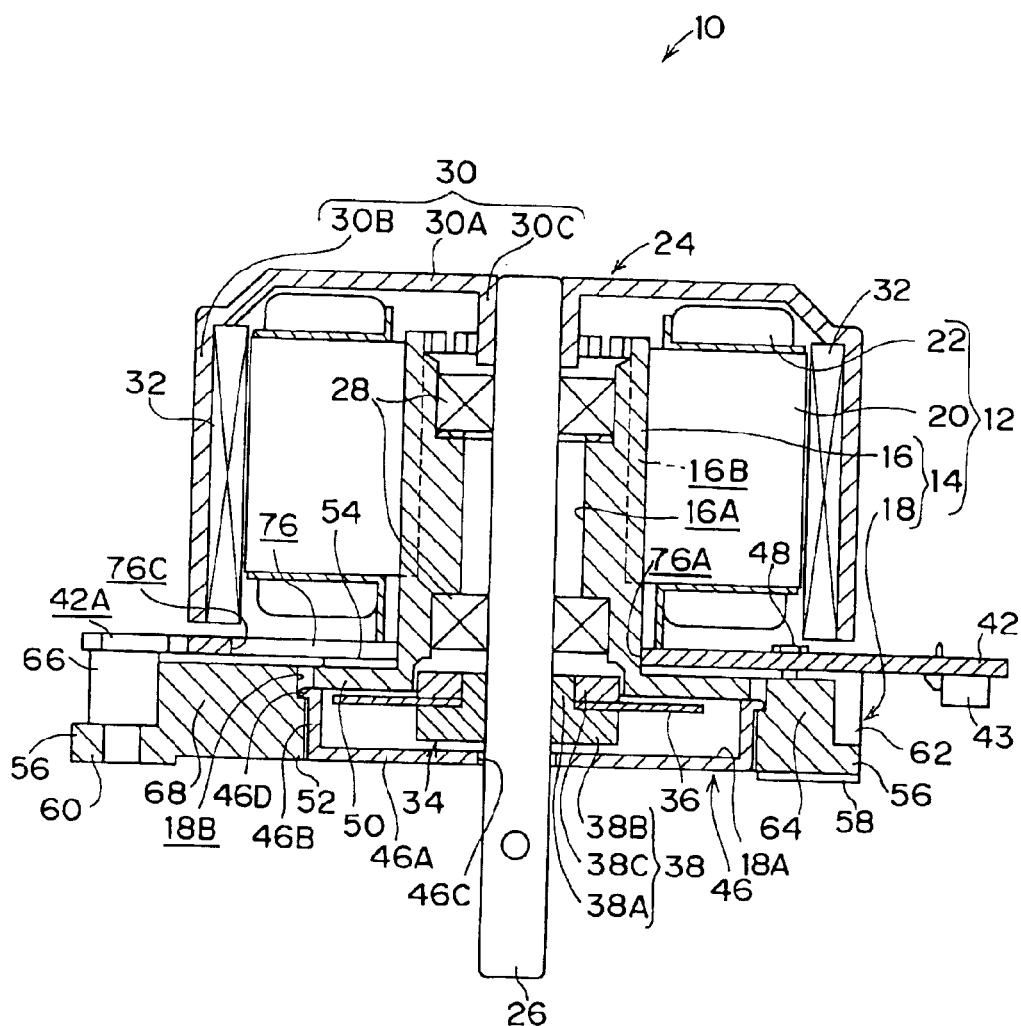
FIG. 3 is a cross sectional view along line III—III in FIG. 1.

With reference to FIGS. 1–3, the outer rotor motor 10 includes a stator 12 that has a stator base 14. The stator base 14 includes a center tubular portion 16 and a stator housing 18. The tubular portion 16 has a generally cylindrical shape. The stator housing 18 is integrally connected to a base end of the tubular portion 16 on a first side of the stator housing 18 (i.e., on a first side of the stator base 14).

A stator core 20 is secured to an outer peripheral portion of the tubular portion 16 by, for example, press fitting, bonding or screwing. Coils 22 are wound around the stator core 20. A sensor chamber 18A is formed in the stator housing 18 and is opened on a second side of the stator housing 18 (i.e., on a second side of the stator base 14), which is opposite from the tubular portion 16, i.e., is opposite from the first side of the stator housing 18. The sensor chamber 18A is communicated with a shaft hole 16A, which extends axially through the tubular portion 16.

The outer rotor motor 10 further includes a rotor 24 and an output shaft 26. The output shaft 26 rotates integrally with the rotor 24. Furthermore, the output shaft 26 is coaxially and rotatably supported by the tubular portion 16 through two bearings 28, which are received in the tubular portion 16. Axial ends of the output shaft 26 protrude from the shaft hole 16A (i.e., the stator 12).

The rotor 24 includes a rotor housing 30 and magnets 32. The magnets 32 are secured to the rotor housing 30. The rotor housing 30 has a generally cup shape and includes a base wall 30A, a cylindrical wall 30B and a cylindrical boss 30C. The cylindrical wall 30B is formed along and extends from an outer peripheral edge of the base wall 30A. The boss 30C is arranged in a center of the base wall 30A. When the output shaft 26 is inserted into the boss 30C, the rotor housing 30 is coaxially secured with the output shaft 26. The cylindrical wall 30B is located radially outward of the coils 22 of the stator 12 and surrounds the coils 22, and the magnets 32 are secured to an inner peripheral surface of the cylindrical wall 30B.

Thus, the outer rotor motor 10 of the first embodiment is formed as a brushless motor, which includes a magnet rotor when electric current is supplied to the coils 22, the rotor 24 and the output shaft 26 are rotated by magnetic forces of the coils 22 and the magnets 32 relative to the stator 12, which is secured to a corresponding apparatus.

The outer rotor motor 10 further includes a code wheel 34. The code wheel 34 is coaxially secured to the output shaft 26. The code wheel 34 includes a sensor plate 36 and a boss 38. The sensor plate 36 has an annular plate shape (disc plate shape). The boss 38 is secured to a center portion of the sensor plate 36. As shown in FIG. 1, the sensor plate 36 includes a predetermined number of slits (serving as an optical pattern) 36A, which are arranged at generally equal intervals in a circumferential direction in an outer peripheral portion of the sensor plate 36. The slits 36A are formed by, for example, printing, etching or the like.

The boss 38 includes a cylindrical wall 38A, a flange 38B and a hold ring 38C. An outer peripheral portion of the cylindrical wall 38A is engaged with the center portion of the sensor plate 36. The flange 38B is integrally formed with the cylindrical wall 38A and extends radially outwardly from one end of the cylindrical wall 38A. The hold ring 38C is formed into a generally ring shape and is fitted to the cylindrical wall 38A to hold the sensor plate 36 between the hold ring 38C and the flange 38B.

An outer diameter of the flange 38B and an outer diameter of the hold ring 38C substantially coincide with each other and are sufficiently smaller than a diameter of an imaginary circle that connects radial inner ends of the slits 36A. Specifically, the code wheel 34 has the slits 36A in a portion of the sensor plate 36, which radially outwardly extends from the boss 38.

The code wheel 34 is secured to the output shaft 26 by, for example, press fitting or bonding at the cylindrical wall 38A of the boss 38, so that the entire code wheel 34 rotates integrally with the output shaft 26.

The code wheel 34 is arranged in the sensor chamber 18A of the stator housing 18 of the stator 12. Multiple (two in this embodiment) rotation sensors 40 are arranged in the sensor chamber 18A to output a signal, which corresponds to a rotational speed of the code wheel 34. In this embodiment, the two rotation sensors 40 are substantially identical to each other and are arranged in a symmetrical manner with respect to the rotational axis of the output shaft 26.

Each rotation sensor 40 is a photo-interrupter and includes two parallel arms 40A, 40B, which are arranged to form a horseshoe-shaped cross section of the rotation sensor 40. The slit forming portion of the sensor plate 36, which has the slits 36A, is placed between the arms 40A, 40B of the rotation sensor 40 without contacting the arms 40A, 40B. In each rotation sensor 40, a light emitting element (not shown) is provided to the arm 40A, and a light receiving element (not shown) is provided to the other arm 40B. With this arrangement, an on/off pulse signal is outputted from each rotation sensor 40 depending on whether light, which is emitted from the light emitting element and passes through the corresponding slit 36A, is received by the light receiving element. The outputted on/off pulse signal corresponds to the rotational speed of the sensor plate 36.

The rotation sensors 40 are installed to a circuit board 42, and the circuit board 42 is secured to the first side of the stator housing 18 where the tubular portion 16 is located. Each rotation sensor 40 protrudes into the sensor chamber 18A through a corresponding rectangular sensor hole (serving as a sensor receiving opening) 44, which penetrates through the stator housing 18 from the first side to the second side of the stator housing 18 in an axial direction of the outer rotor motor 10, i.e., in the axial direction of the output shaft 26.

An open end of the sensor chamber 18A is covered by a cover 46. The cover 46 includes a cover main body 46A and a peripheral wall 46B. The cover main body 46 has a shape, which corresponds to a shape of the sensor chamber 18A when the sensor chamber 18A is viewed in a direction perpendicular to a plane of the sensor chamber 18A, as shown in FIG. 1. The peripheral wall 46B is formed along and extends from an outer peripheral edge of the cover main body 46A in the axial direction of the outer rotor motor 10, and the peripheral wall 46B is received in the sensor chamber 18A. A through hole 46C is formed in the cover main body 46A, and the output shaft 26 protrudes outwardly from the cover 46 through the through hole 46C. Furthermore, four engaging claws 46D, which are formed in the peripheral wall 46B, are engaged with four engaging holes 18B, which are formed in the stator housing 18, so that unintentional removal of the cover 46 from the stator housing 18 is effectively limited.

The circuit board 42, to which the rotation sensors 40 are installed, includes a connector 43, which is located in a first longitudinal end of the circuit board 42 and is externally connected to an external power source (not shown) through a connectorized cable (not shown). The circuit board 42 further includes electrical components, such as a Hall element 48 and a control circuit (or a control element or control device such as a CPU) 25, which are required to drive and control the outer rotor motor 10. The Hall element 48 senses a magnetic pole position of the rotor 24. The control circuit (or the element such as the CPU) 25 controls power supply to the coils 22 and serves as a control means for controlling a rotational speed of the output shaft 26.

More specifically, the control circuit 25 receives output signals from the rotation sensors 40 and maintains or changes a power supply pattern to the coils 22 to drive the output shaft 26 at a preset rotational speed. Furthermore, the control circuit 25 computes an average value of rotational speed measurements of the rotation sensors 40 (or information values that correspond to the rotational speed measurements of the rotation sensors 40), each of which is obtained based on the output signal of the corresponding rotation sensor 40 and each of which indicates the measured rotational speed of the sensor plate 36. When the computed average value (i.e., the actual rotational speed of the sensor plate 36, i.e., of the output shaft 26) of the rotational speed measurements differs from the preset rotational speed, the power supply pattern to the coils 22 is changed to maintain the preset rotational speed of the sensor plate 36 and thus of the code wheel 34. As described above, since the control circuit 25 computes the average value of the rotational speed measurements, each of which is obtained based on the output signal of the corresponding one of the two rotation sensors 40, it is possible to minimize a measurement error, which would be caused by a relatively low degree of installation precision of the code wheel 34 with respect to the output shaft 26 (such as a deviation in the rotational axis or a deviation in the angular position). Therefore, more accurate rotational speed control of the outer rotor motor 10 is possible with the above arrangement.

With reference to FIGS. 4–7B, a structure of the stator base 14 will be described.

In the stator base 14, the tubular portion 16 and the stator housing 18 are integrally formed. As discussed above, the tubular portion 16 is formed into the generally cylindrical shape and has the shaft hole 16A, which axially penetrates through the tubular portion 16. A plurality of engaging grooves 16B is formed in an outer peripheral portion of the tubular portion 16 except a stator housing 18 side end (i.e., a base end that has a generally circular cross section) of the tubular portion 16 to non-rotatably engage with the stator core 20.

The stator housing 18 includes a base plate 50 and a frame wall 52. The base plate 50 extends radially outward from the base end of the tubular portion 16 in a direction away from the shaft hole 16A in a plane perpendicular to the axial direction of the output shaft 26. With this arrangement, the shaft hole 16A also penetrates through the base plate 50. The frame wall 52 is formed along and axially extends from an outer peripheral edge of the base plate 50 on a side opposite from the tubular portion 16. The sensor chamber 18A is formed inward of the frame wall 52.

The base plate 50 includes a rectangular plate portion 50A and an arcuate plate portion 50B. The rectangular plate portion 50A has a generally rectangular shape when the rectangular plate portion 50A is viewed in a direction perpendicular to a plane of the rectangular plate portion 50A. Long sides of the rectangular plate portion 50A extend from a top side to a bottom side in FIG. 6A or 6B, and short sides of the rectangular plate portion 50A extend from a left side to a right side in FIG. 6A or 6B. That is, a longitudinal direction of the rectangular plate portion 50A coincides with the top-bottom direction of FIG. 6A or 6B. The arcuate plate portion 50B is connected to the rectangular plate portion 50A except the longitudinal ends (upper and lower ends in FIG. 6A or 6B) of the rectangular plate portion 50A, and an arc of the arcuate plate portion 50B is generally coaxial with the tubular portion 16. As discussed above, the frame wall 52 and the sensor chamber 18A correspond to a shape of the outer peripheral edge of the base plate 50, which includes the rectangular plate portion 50A and the arcuate plate portion 50B connected together. The axis of the tubular portion 16 is located within the rectangular plate portion 50A when the tubular portion 16 is viewed in the direction perpendicular to the plane of the rectangular plate portion 50A. A portion of an inner peripheral edge of the tubular portion 16 (a peripheral edge of the shaft hole 16A) forms an inner peripheral edge of the arcuate plate portion 50B.

Figure 9:
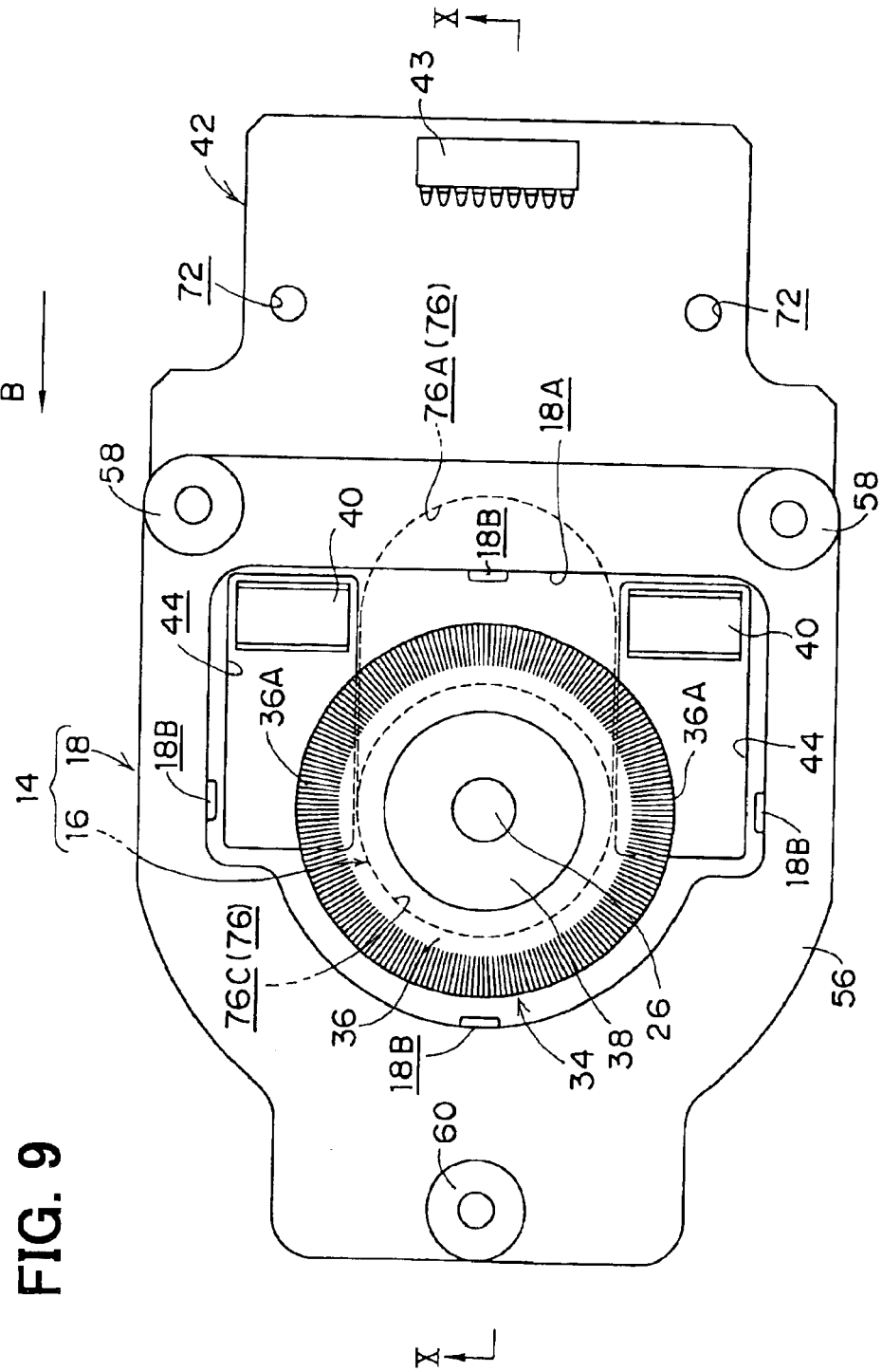
FIG. 9 is a front view showing the circuit board of the outer rotor motor of the first embodiment held in a non-interfering position.

The sensor holes 44 penetrate through the rectangular plate portion 50A from a first side to a second side of the rectangular plate portion 50A, i.e., from a tubular portion 16 side to the sensor chamber 18A side in a direction parallel to the axial direction of the output shaft 26. Furthermore, the sensor holes 44 are located in the longitudinal ends of the rectangular plate portion 50A and are spaced from an outer peripheral edge of the rectangular plate portion 50A. Furthermore, long sides of each rectangular sensor hole 44 extend in a direction parallel to the short sides of the rectangular plate portion 50A. The tubular portion 16 is located between the sensor holes 44 in the longitudinal direction of the rectangular plate portion 50A. As shown in FIG. 1, a size of the short side of each sensor hole 44 generally corresponds to a length of the corresponding rotation sensor 40 measured along a long side of the rectangular rotation sensor 40 in a longitudinal direction of the rotation sensor 40 (i.e., in a top-bottom direction in FIG. 1). Furthermore, a size of the long side of each sensor hole 44 is set to allow positioning of each rotation sensor 40 between a sensing position and an installation preparation position. In the sensing position of the rotation sensor 40, the sensor plate 36 is positioned between the arms 40A, 40B of the rotation sensor 40 to allow measuring of the rotational speed of the sensor plate 36 by the rotation sensor 40. In the installation preparation position, the sensor plate 36 is not positioned between the arms 40A, 40B of the rotation sensor 40 and thus does not interfere with the arms 40A, 40B, as shown in FIG. 9. The size of the long side of the sensor hole 44 will be described more specifically below.

Two circuit board contact surfaces 54 are formed in an outer surface of the base plate 50 on the first side of the stator housing 18 (i.e., on the first side of the base plate 50) and protrude from the rest of the outer surface of the base plate 50 on the first side of the stator housing 18. Each circuit board contact surface 54 is formed in a portion of the outer surface of the base plate 50, which is located on an outer side (side opposite from the tubular portion 16, i.e., a top side or a lower side in FIG. 6B) of an imaginary line that extends along an inner one of the long sides of the corresponding sensor hole 44 located adjacent the tubular portion 16. Each engaging hole 18B, which engages the corresponding engaging claw 46D of the cover 46, opens in the outer surface of the base plate 50 on the first side of the stator housing 18. Furthermore, each engaging hole 18B axially extends from the outer surface of the base plate 50 along a portion of the frame wall 52 and is communicated with the sensor chamber 18A.

Figure 4:
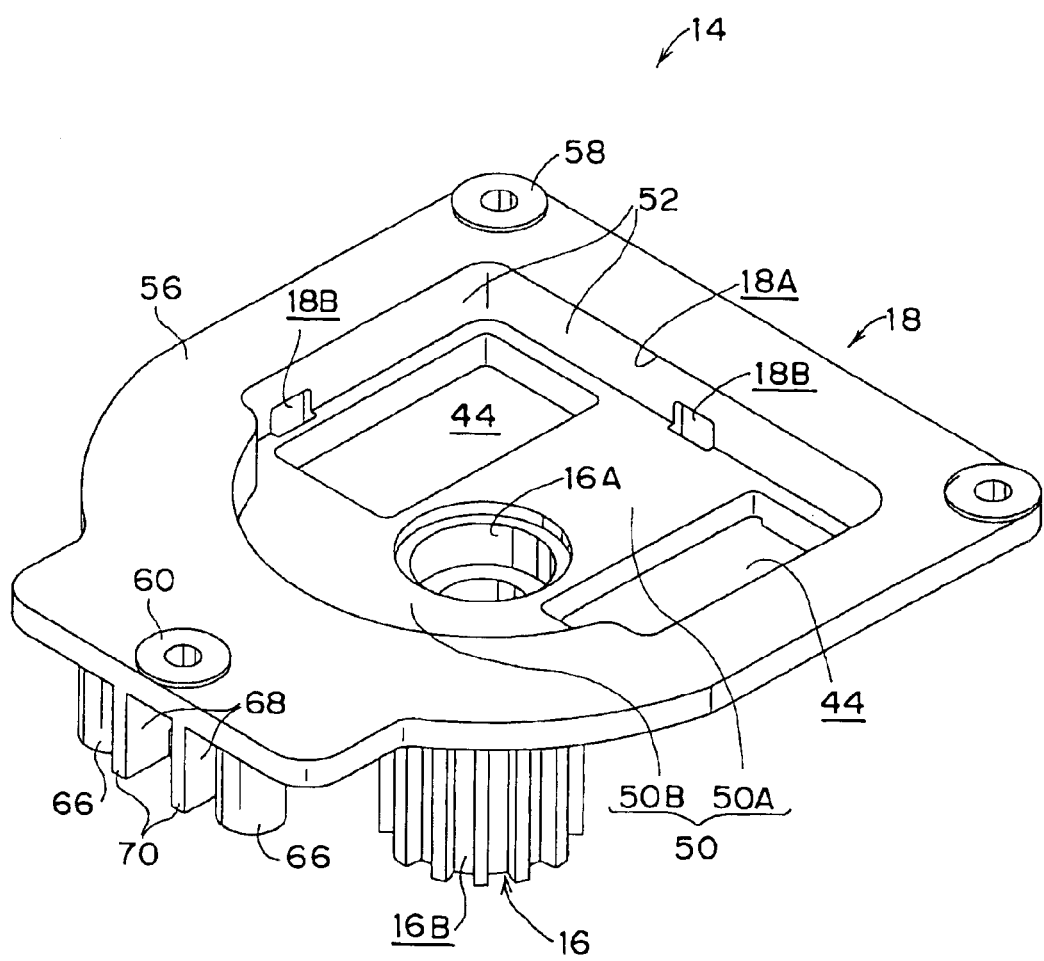
FIG. 4 is a frontal perspective view of a stator base of the outer rotor motor of the first embodiment.
Figure 6A:
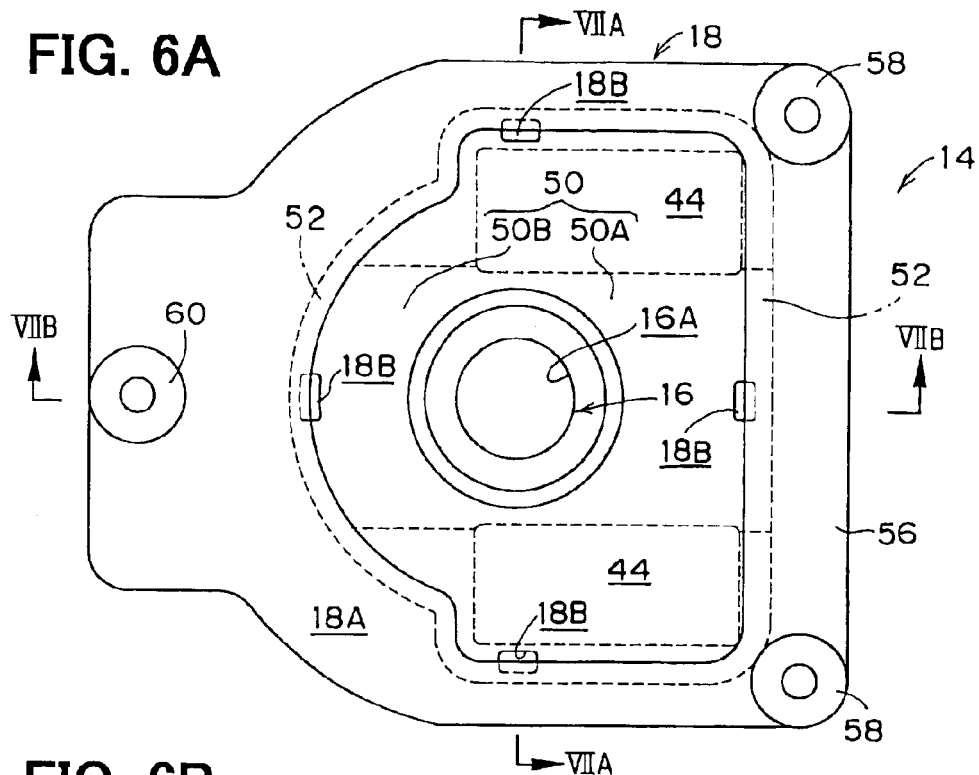
FIG. 6A is a front view of the stator base of the outer rotor motor of the first embodiment.

The stator housing 18 further includes a overhang 56. The overhang 56 extends outwardly in a direction away from the output shaft 26 from an open end of the frame wall 52 (i.e., an axial distal end of the frame wall 52, which is opposite from the base plate 50) in a direction generally parallel to a plane of the base plate 50. The overhang 56 has a shape similar to that of the base plate 50. As shown in FIGS. 4 and 6A, two connecting portions 58, which are used to secure the stator housing 18 to the corresponding apparatus, are formed in two corners of a first longitudinal end of the overhang 56 on one side of the rectangular plate portion 50A that is opposite from the arcuate plate portion 50B. With reference to FIG. 6A, a connecting portion 60, which is used to secure the stator housing 18 to the corresponding apparatus, is formed in a center (top-bottom center in FIG. 6A) of a second longitudinal end of the overhang 56, which is opposite from the first longitudinal end of the overhang 56 and is located near the arcuate plate portion 50B.

Figure 5:
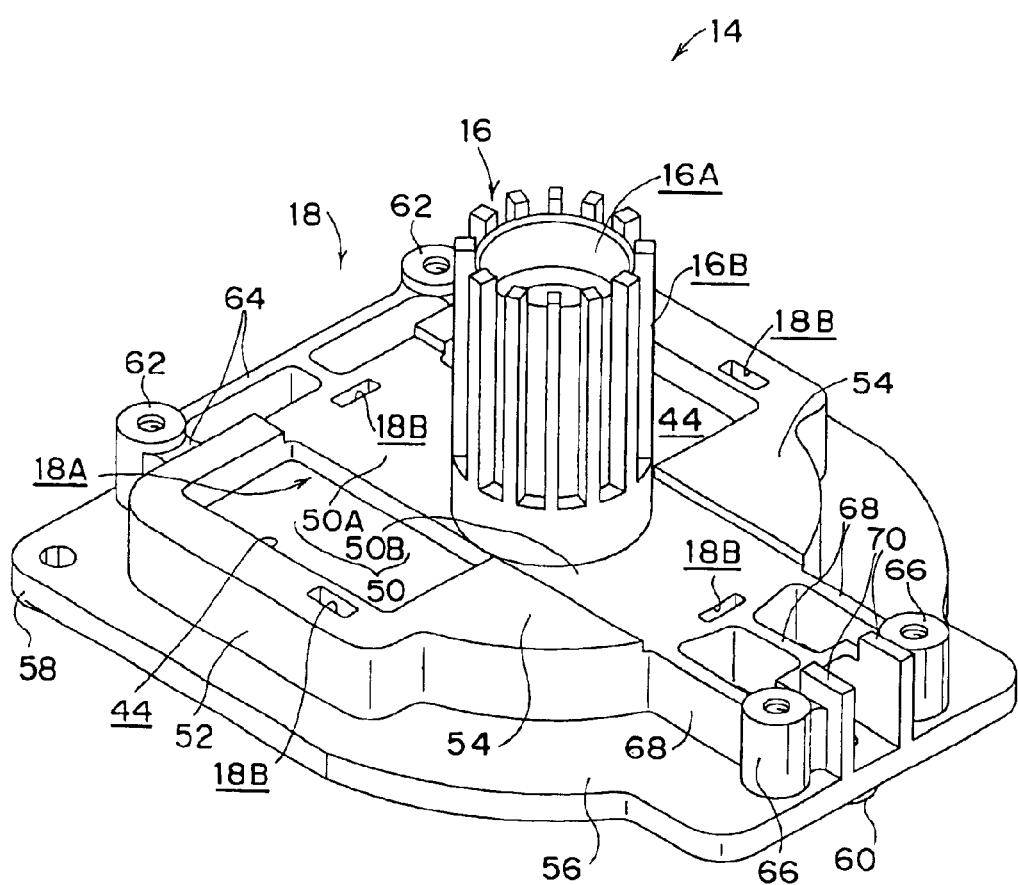
FIG. 5 is a rear perspective view of the stator base of the outer rotor motor of the first embodiment.
Figure 6B:
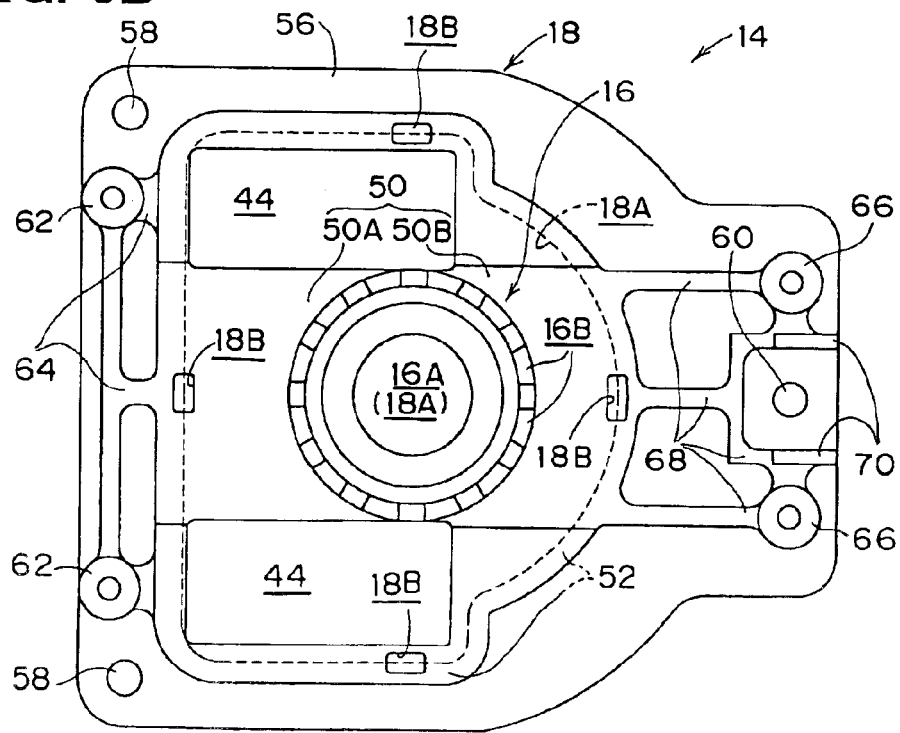
FIG. 6B is a rear view of the stator base of the outer rotor motor of the first embodiment.
Figure 7A:
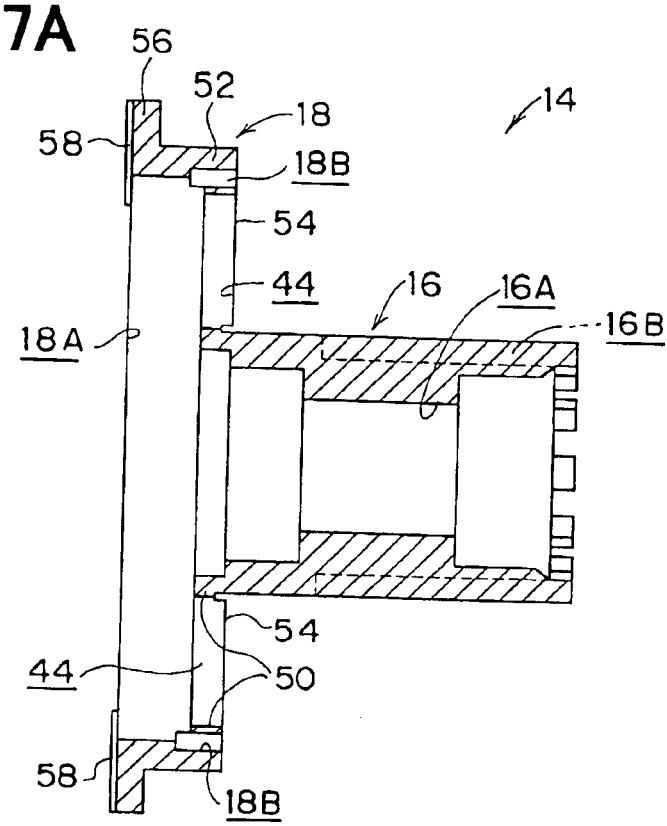
FIG. 7A is a cross sectional view along line VIIA—VIIA in FIG. 6A.
Figure 7B:
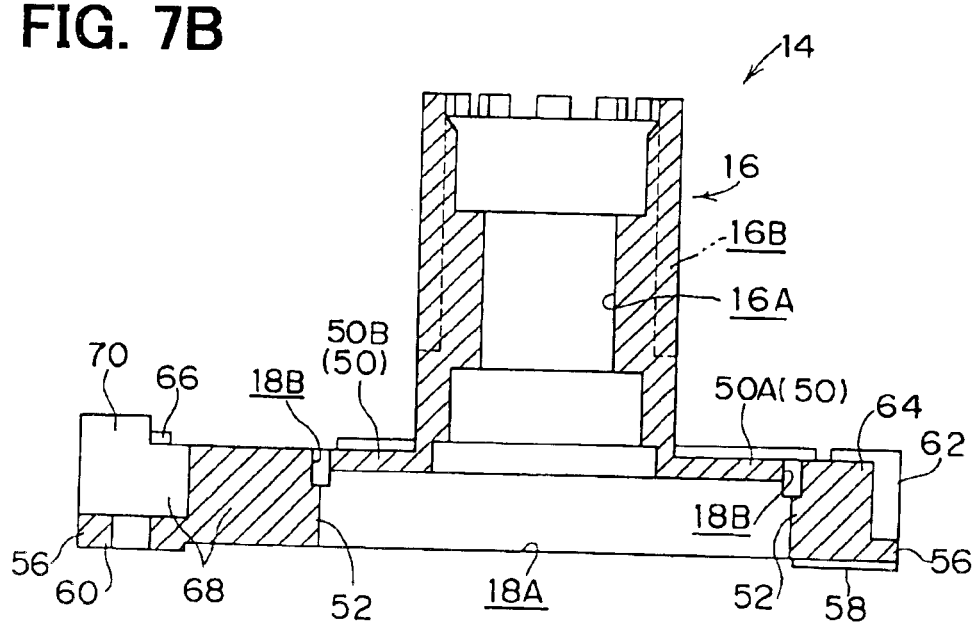
FIG. 7B is a cross sectional view along line VIIB—VIIB in FIG. 6A.

As shown in FIGS. 5 and 6B, two screw bosses 62, each of which has a female thread in an inner peripheral surface of the screw boss 62, are formed between the connecting portions 58 to protrude from the overhang 56 on the first side of the stator housing 18 where the tubular portion 16 is arranged. Each screw boss 62 is located near a corresponding one of the connecting portions 58. An axial height of an axial end surface of each screw boss 62 is substantially the same as that of the circuit board contact surface 54. Furthermore, each screw boss 62 is reinforced by ribs 64, which extend from the frame wall 52 and has an axial height lower than that of the screw boss 62.

Furthermore, two screw bosses 66, each of which has a female thread in an inner peripheral surface of the screw boss 66, are arranged in a symmetrical manner with respect to the connecting portion 60 located in the second longitudinal end of the overhang 56. The screw bosses 66 protrude from the overhang 56 on the first side of the stator housing 18 where the tubular portion 16 is arranged. An axial height of an axial end surface of each screw boss 66 is substantially the same as that of the circuit board contact surface 54. Furthermore, each screw boss 66 is reinforced by ribs 68, which extend from the frame wall 52 and has an axial height lower than that of the screw boss 66. Two limiting walls 70 extend from the rib 68 between the screw bosses 66. An axial height of each limiting wall 70 is higher than that of the screw bosses 66 by an amount that corresponds to a wall thickness of the circuit board 42.

In the above-described stator base 14, the base plate 50 may also be referred as an extension, and the circuit board contact surfaces 54 and the screw bosses 62, 64 may also be referred as securing portions.

Figure 8A:
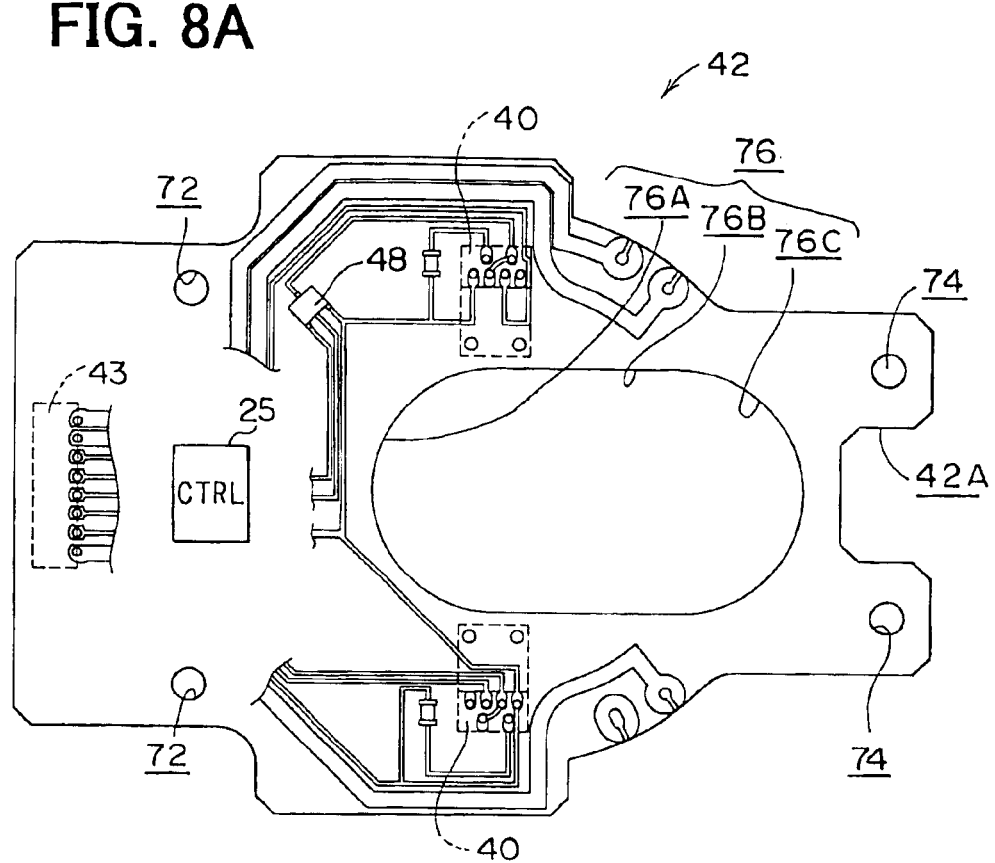
FIG. 8A is a rear view of a circuit board of the outer rotor motor of the first embodiment.
Figure 8B:
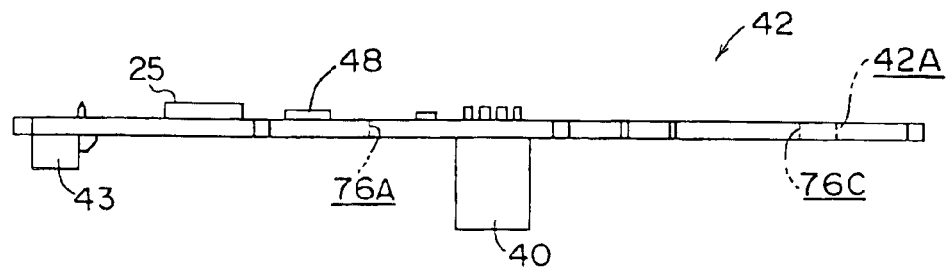
FIG. 8B is a side view of the circuit board of the outer rotor motor of the first embodiment.

As shown in FIGS. 8A and 8B, the circuit board 42 is formed into a shape that generally corresponds to the overhang 56 of the stator base 14. The circuit board 42 includes through holes 72, 74. Each through hole 72 is formed in a position, which corresponds to the corresponding screw boss 62 of the overhang 56. Each through hole 74 is formed in a position, which corresponds to the corresponding screw boss 66.

A generally rectangular recess 42A is formed in a second longitudinal end of the circuit board 42, which is opposite from the first longitudinal end of the circuit board 42, between the through holes 74. A distance between opposed two edges of the recess 42A corresponds to a distance between the limiting walls 70. As discussed above, the connector 43 is arranged in the first longitudinal end of the circuit board 42, which is opposite from the recess 42A. A position of the connector 43 in the circuit board 42 is set to place the connector 43 outside of the overhang 56 (FIG. 1) upon installation of the circuit board 42 to the stator housing 18.

The circuit board 42 further includes a through hole (tubular portion receiving opening) 76, which is spaced from an outer peripheral edge of the circuit board 42 and penetrates through the circuit board 42 in a direction perpendicular to the plane of the circuit board 42, i.e., in the axial direction of the output shaft 26. As shown in FIG. 1, the through hole 76 is formed as an elongated hole, which is elongated in the longitudinal direction of the sensor holes 44, i.e., in a direction perpendicular to the axial direction of the output shaft 26 to have a racetrack shape. Each of longitudinal ends of the through hole 76 is formed into a semicircular shape, which generally corresponds to an outer diameter of the tubular portion 16.

More specifically, with reference to FIG. 8A, the through hole 76 includes a first semicircular part 76A, a straight part 76B and a second semicircular part 76C. The first semicircular part 76A is located generally in the center of the circuit board 42. The straight part 76B extends continuously from the first semicircular part 76A toward the second longitudinal end of the circuit board 42 where the through holes 74 are formed. The second semicircular part 76C extends continuously from the straight part 76B on a side opposite from the first semicircular part 76A. The rotation sensors 40 are arranged in opposed relationship to each other at boundaries between the first semicircular part 76A and the straight part 76B, as shown in FIG. 8A.

The through hole 76 receives the tubular portion 16 of the stator base 14 and has a length that is determined to allow positioning of the circuit board 42 between a non-interfering position (FIGS. 9 and 10) and an installation position (FIG. 1). As discussed above, in the non-interring position of the circuit board 42, each rotation sensor 40 is placed in the installation preparation position, and an inner peripheral edge of the second semicircular part 76C of the through hole 76 is engaged with the tubular portion 16. Furthermore, in the installation position of the circuit board 42, each rotation sensor 40 is placed in the sensing position, and the inner peripheral edge of the second semicircular part 76C of the through hole 76 is spaced away from the tubular portion 16 while an inner peripheral edge of the first semicircular part 76A is engaged with the tubular portion 16. Sizes of the through hole 76 will be described with reference to FIG. 11.

Figure 11:
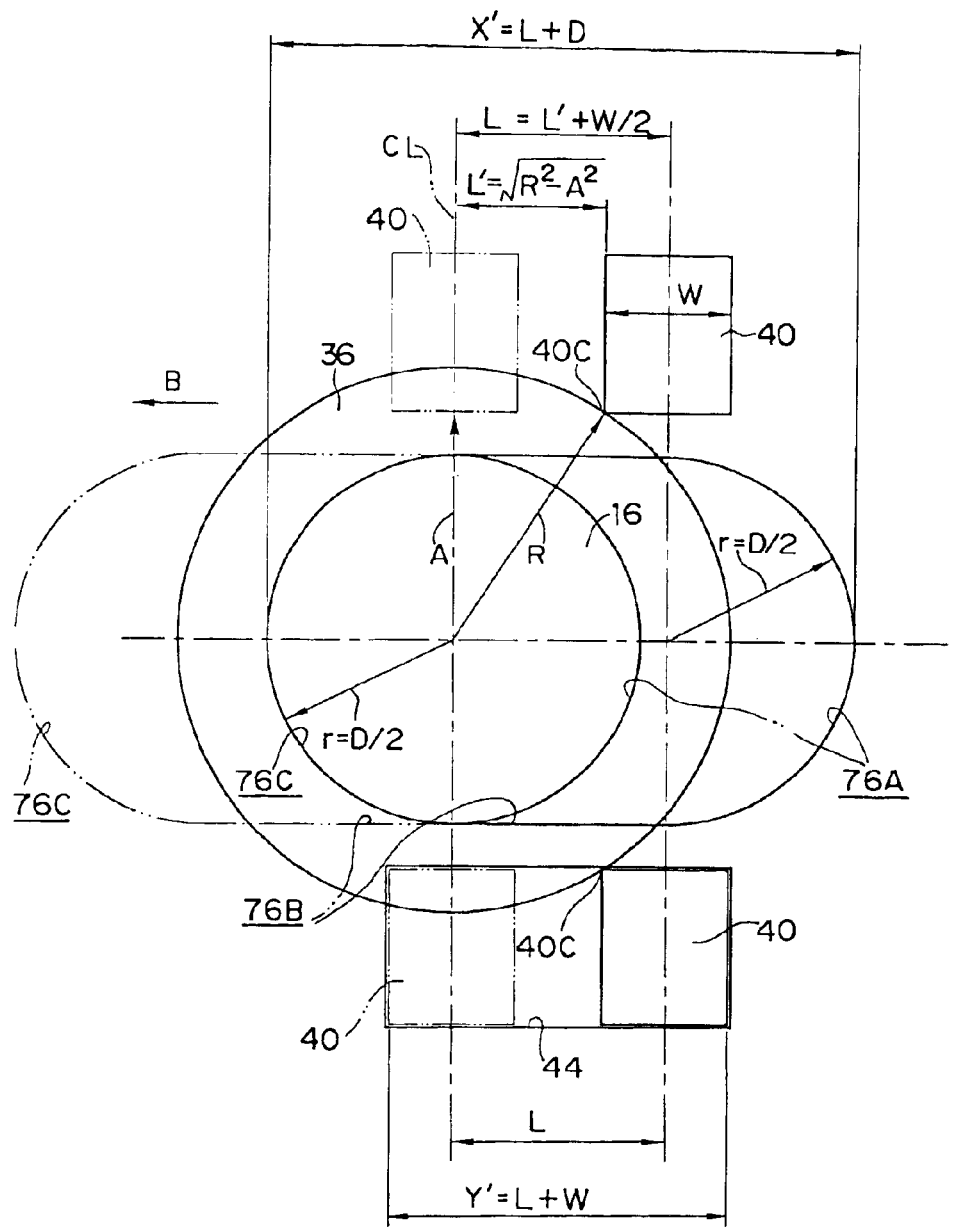
FIG. 11 is a schematic diagram showing sizes of an elongated hole of the circuit board and sizes of the sensor holes of the stator base of the first embodiment.

As indicated by solid lines in FIG. 11, in a case where the circuit board 42 is viewed in the direction perpendicular to the plane of the circuit board 42 (i.e., in the axial direction of the tubular portion 16), when a corner 40C of the rotation sensor 40 is located in an outer edge of the sensor plate 36, the rotation sensor 40 is in the installation preparation position. Furthermore, as indicated by an imaginary line in FIG. 11, in the sensing position, a widthwise center line CL of the rotation sensor 40 coincides with a diametrical direction of the sensor plate 36. Furthermore, an outer diameter of the tubular portion 16 is denoted by reference letter "D", and an outer radius (=D/2) of the tubular portion 16 is denoted by reference letter "r". Here, the outer radius r of the tubular portion 16 coincides with an inner radius (radius of curvature) r of the first semicircular part 76A or of the second semicircular part 76C.

Furthermore, an outer radius of the sensor plate 36 is denoted by reference letter "R", and a minimum distance between the center of the sensor plate 36 (i.e., the rotational axis of the output shaft 26) and the rotation sensor 40 (a distal end of each arm 40A, 40B) held in the sensing position is denoted by reference letter "A". Also, a width of the rotation sensor 40 (a width of each arm 40A, 40B), which is measured in the longitudinal direction of the through hole 76, is denoted by "W". In the following section, a condition for a length X of the through hole 76, which allows movement of each rotation sensors 40 of the circuit board 42 between the installation preparation position and the sensing position, will be described.

First, a moving distance L between the installation preparation position and the sensing position of the rotation sensor 40 is obtained for the above theoretical settings. As is clearly shown in FIG. 11, the moving distance L is a sum of a distance L' between the center line CL and the corner 40C and one half of the width W of the rotation sensor 40 (L=L'+W/2). Based on the Pythagorean theorem, the distance L' is defined as $(R^2-A^2)^{1/2}$, and thus the moving distance L is defined as $L=(R^2-A^2)^{1/2}+W/2$. Furthermore, as is clearly understood from the diagram of FIG. 11, the moving distance L corresponds to a length of the straight part 76B of the through hole 76. Thus, when a theoretical length of the through hole 76 under the above theoretical settings is assumed to be X', the theoretical length X' is a sum of the length L, the radius r of the first semicircular part 76A and the radius r of the second semicircular part 76C. That is, $X'=L+2\times r=L+D$.

Upon consideration of dimensional accuracy, assembling accuracy and a degree of easiness of assembly of each component, the actual length X of the through hole 76 needs to be increased from the theoretical length X', so that $X>X'=(R^2-A^2)^{1/2}+W/2+D$ is adapted as the condition for the length X.

Next, a condition for a length Y of each sensor hole 44 will be described. When a theoretical length of the sensor hole 44 under the above theoretical settings is assumed to be Y', the theoretical length Y' is a sum of the distance L and the width W, as is clearly understood from the diagram of FIG. 11. Thus, Y'=L+W. Similar to the case of the through hole 76, the actual length Y needs to be increased from the theoretical length Y', so that $Y>Y'=(R^2-A^2)^{1/2}+3\times W/2$ is adapted as the condition for the length Y.

The above-described circuit board 42 is secured to the stator base 14 as follows. First, the tubular portion 16 of the stator base 14 is inserted through the through hole 76 of the circuit board 42, so that a rotation sensor 40 side installation surface of the circuit board 42, in which the rotation sensors 40 are installed, is engaged with the circuit board contact surface of the stator base 14 and the end surface of the screw bosses 62, 66, and the circuit board 42 is positioned from the non-interfering position to the installation position. Then, screws (not shown) are threaded into the screw bosses 62, 66 through the through holes 72, 74 of the circuit board 42 to secure the circuit board 42 to the stator base 14. As shown in FIGS. 1 and 2, the circuit board 42, which is held in the installation position, closes the sensor holes 44. Upon securing of the circuit board 42 to the stator base 14, the stator core 20 is secured to the tubular portion 16 of the stator base 14.

Next, operation of the outer rotor motor 10 of the first embodiment will be described.

When the coils 22 are energized, the rotor 24, the output shaft 26 and the code wheel 34 are integrally rotated in the outer rotor motor 10. At this time, each rotation sensor 40 outputs on/off pulse signals, which correspond to the rotational speed of the code wheel 34, i.e., of the sensor plate 36, to the control circuit 25 of the circuit board 42.

The control circuit 25 computes an average value of the measurements of the rotation sensors 40, each of which indicates the rotational speed of the sensor plate 36. Then, the control circuit 25 sets the average value as the actual rotational speed of the sensor plate 36, i.e., of the output shaft 26 and compares this actual rotational speed with the preset rotational speed. Thereafter, the control circuit 25 changes or maintains the power supply pattern to the coils 22 in such a manner that the actual rotational speed (i.e., the average value of the rotational speed measurements) of the output shaft 26 coincides with the preset rotational speed. In this way, the rotational speed of the output shaft 26, to which the code wheel 34 is secured, is maintained at the preset rotational speed.

As described above, the two rotation sensors 40, which are symmetrically arranged with respect to the axis of the output shaft 26, are provided in the outer rotor motor 10, and the control circuit 25 computes the average value of the rotational speed measurements of the rotation sensors 40, each of which is obtained based on the output signal of the corresponding rotation sensor 40. Thus, even when the rotational axis of the sensor plate 36 is deviated from the rotational axis of the output shaft 26 or even when the sensor plate 36 is angularly deviated from the output shaft 26, the actual rotational speed of the output shaft 26 can be more accurately measured. Thus, the control of the power supply pattern to the coils 22, i.e., the control of the rotational speed of the output shaft 26 is performed based on the more accurate measurement result, so that the output shaft 26 is reliably and stably rotated at the preset rotational speed.

At the time of assembling the outer rotor motor 10, the output shaft 26, to which the code wheel 34 is secured, is installed to the tubular portion 16 and is supported by the tubular portion 16 through the bearings 28, so that the code wheel 34 is placed in the sensor chamber 18A of the stator base 14, i.e., is placed in the assembling position. Next, the rotation sensor 40 side installation surface of the circuit board 42 is oriented toward the circuit board contact surfaces 54 of the stator base 14 and is then moved toward the circuit board contact surfaces 54 in the axial direction of the output shaft 26, and thereby the tubular portion 16 is inserted into the through hole 76 of the circuit board 42.

Next, a half of the tubular portion 16 is positioned in the second semicircular part 76C of the through hole 76. Then, the circuit board 42 is further moved toward the circuit board contact surface 54 in the axial direction of the tubular portion 16, and each rotation sensor 40 is received through the corresponding sensor hole 44 of the stator housing 18 to place the rotation sensor 40 in the sensor chamber 18A. In this way, as shown in FIGS. 9 and 10, the circuit board 42 is placed in the non-interfering position where each rotation sensor 40 is positioned in the installation preparation position.

Figure 10:
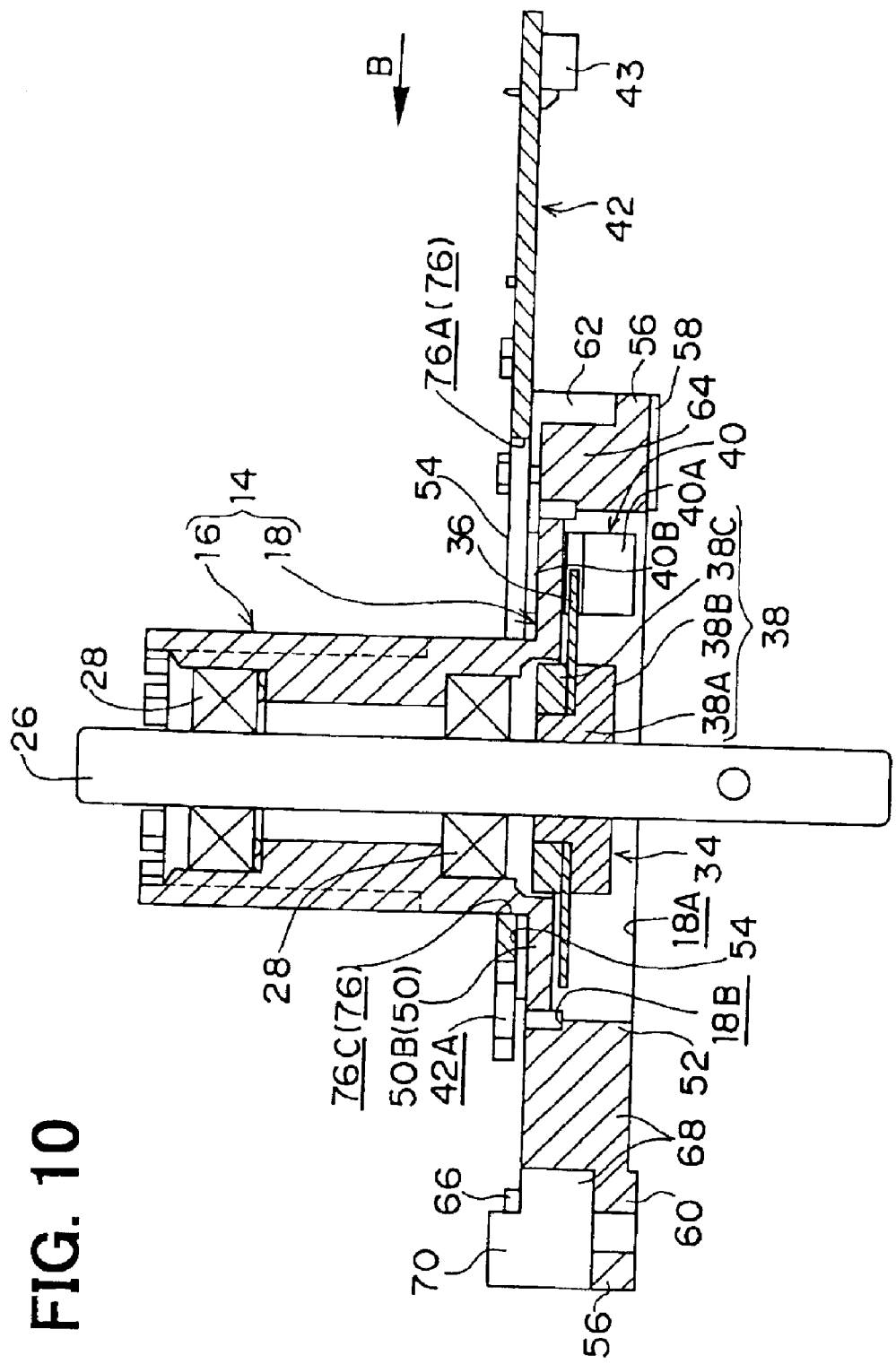
FIG. 10 is a cross sectional view along line X—X in FIG. 9.

Next, the circuit board 42 is moved in a direction of an arrow B in FIGS. 9 and 10 along the circuit board contact surfaces 54 while the second semicircular part 76C side end of the circuit board 42 serves as a leading end of the circuit board 42. Thus, each rotation sensor 40 is moved along a corresponding tangent line, which is tangent to the circle of the sensor plate 36, and the slit forming portion of the sensor plate 36, which has the slits 36A, is received between the arm 40A and the arm 40B of the rotation sensor 40. That is, the sensor plate 36 is relatively moved toward the rotation sensor 40 along the tangent line in the tangent direction of the sensor plate 36, and the sensor plate 36 is received between the arm 40A and the arm 40B through a lateral opening defined between the arm 40A and the arm 40B.

When the circuit board 42 reaches the installation position where each rotation sensor 40 is positioned in the sensing position, the limiting walls 70 of the stator base 14 engage the recess 42A of the circuit board 42, and the circuit board 42 is temporarily held by the stator base 14, i.e., is temporarily positioned. At this time, a half of the tubular portion 16 is received in the first semicircular part 76A of the through hole 76. Then, the screws are threaded into the screw bosses 62, 66 of the stator base 14 through the through holes 72, 74, and the circuit board 42 is engaged with the circuit board contact surfaces 54 and each screw boss 62, 66 to secure the circuit board 42 to the stator base 14. In this way, the circuit board 42 is precisely positioned relative to the stator base 14, and the rotation sensors 40 are positioned on opposite sides of the output shaft 26 to oppose each other.

Thereafter, the cover 46 is installed to the stator housing 18 of the stator base 14. Also, the stator core 20, around which the coils 22 are wound, is secured to the tubular portion 16. Then, the coils 22 and the circuit board 42 are electrically connected together. Furthermore, the boss 30C of the rotor housing 30, to which the magnets 32 are secured, is secured to the output shaft 26.

In this way, the assembly (manufacturing) of the outer rotor motor 10 is completed.

As discussed above, the circuit board 42, which has the rotation sensors 40, has the through hole 76, through which the tubular portion 16 is received. Thus, the single circuit board 42 can provide a relatively large surface area for installing the electrical components while a size of the circuit board 42 is not substantially increased in any specific direction relative to the tubular portion 16, and the amount of the protrusion from the overhang 56 is minimized.

In the state where the through hole 76 receives the tubular portion 16, the through hole 76 allows the movement of the circuit board 42 between the non-interfering position and the installation position. More specifically, the length X of the through hole 76 satisfies the condition of $X > (R^2 - A^2)^{1/2} + W/2 + D$. Thus, while the relatively large surface area of the circuit board 42 is maintained, the circuit board 42, which has the rotation sensors 40 can be installed to the stator 12. Particularly, the through hole 76 is formed as the elongated hole, so that a loss of the surface area of the circuit board 42 is reduced in comparison to a case where the through hole is formed as a circular through hole, which has a diameter that is equal to the length X. Thus, it is easy to provide the sufficient surface area of the circuit board.

With the above structure, the single circuit board 42 has all the required electrical components, such as the rotation sensors 40, the Hall element 48 and the control circuit (control element or device) 25, which are required to drive and control the outer rotor motor 10.

The sensor plate 36 is inserted between the arms 40A, 40B of each rotation sensor 40 in the tangential direction of the sensor plate 36 by the movement of the circuit board 42 from the non-interfering position to the installation position. Specifically, the longitudinal direction of the through hole 76 coincides with the widthwise direction of the rotation sensor 40, i.e., coincides with the direction of the width W (widthwise direction) of the rotation sensor 40, and the lateral openings between the arms 40A, 40B of each rotation sensor 40 are opposed to each other in the widthwise direction of the rotation sensor 40. Thus, the circuit board 42 can be installed to the stator 12 while the circuit board 42 has the rotation sensors 40 that are oriented such that the distal end openings (each opening being directed toward the axis of the sensor plate 36) of the rotation sensors 40 are opposed to each other, and thereby the widthwise extent of the one rotation sensor 40 coincides with the widthwise extent of the other rotation sensor 40. With the above arrangement, the sufficient surface area is provided in the circuit board 42.

Furthermore, each sensor hole 44 of the stator housing 18, through which the corresponding rotation sensor 40 is projected into the sensor chamber 18A, allows movement of the corresponding sensor 40 between the installation preparation position and the sensing position. In other words, each sensor hole 44 allows the movement of the circuit board 42, to which the rotation sensors 40 are installed, between the non-interfering position and the installation position. More specifically, the longitudinal size Y of each sensor hole 44 satisfies the condition of $Y > (R^2 - A^2)^{1/2} + 3 \times W/2$. Because of this arrangement, the single circuit board 42, which has all the required electrical components, can be installed to the stator 12 in such a manner that the sensor plate 36 is received between the arms 40A, 40B of each rotation sensor 40, and the circuit board 42 can be positioned on the tubular portion 16 side of the stator housing 18, i.e., on the rotor 24 side of the stator housing 18. Thus, the electrical connection between the circuit board 42 and the coils 22 is eased, and there is no substantial limitation on the positioning of the Hall element 48.

Furthermore, in the manufacturing method of the outer rotor motor 10, the step of inserting the tubular portion 16 into the through hole 76 and moving the circuit board 42 toward the circuit board contact surfaces 54 of the stator housing 18 is separated from the step of moving the circuit board 42 along the circuit board contact surfaces 54 to insert the sensor plate 36 between the arms 40A, 40B of each rotation sensor 40 while avoiding an interference between the circuit board 42 and the tubular portion 16 by the provision of the through hole 76. Because of the separation of the above steps, the single circuit board 42, which has the relatively large surface area and has the rotation sensors 40, can be installed to the stator 12 in such a manner that the sensor plate 36 is inserted between the arms 40A, 40B of each rotation sensor 40. That is, because of the separation of the above steps, all the required electrical components can be installed to the single circuit board 42. Particularly, the movement of the circuit board 42 along the circuit board contact surfaces 54 of the stator housing 18 causes insertion of the sensor plate 36 between the arms 40A, 40B of each rotation sensor 40 in the tangential direction of the sensor plate 36, so that the installation of the rotation sensors 40 to the circuit board 42 is made possible.

As described above, in the outer rotor motor 10 and the manufacturing method of the outer rotor motor 10 according to the first embodiment, it is possible to insert the sensor plate 36 between the arms 40A, 40B of each rotation sensor 40 at the time of installing the circuit board 42 to the stator 12 while the relatively large surface area is provided in the circuit board 42, which has the rotation sensors 40.

Furthermore, the circuit board 42, which is held in the installation position, closes the sensor holes 44, which cannot be closed by the cover 46. Thus, intrusion of light or foreign particles or objects into the sensor chamber 18A, which receives the rotation sensors 40, through the sensor holes 44 can be limited to limit occurrence of rotational speed measurement errors of the rotation sensors 40, which are made as the rotation sensors (photo-interrupters).

Furthermore, in the first embodiment, the outer rotor motor 10 includes the circuit board 42, which has the elongated through hole 76. However, the present invention is not limited to this arrangement. For example, as shown in FIG. 12, in place of the circuit board 42, the outer rotor motor 10 can include a circuit board 80.

Figure 12:
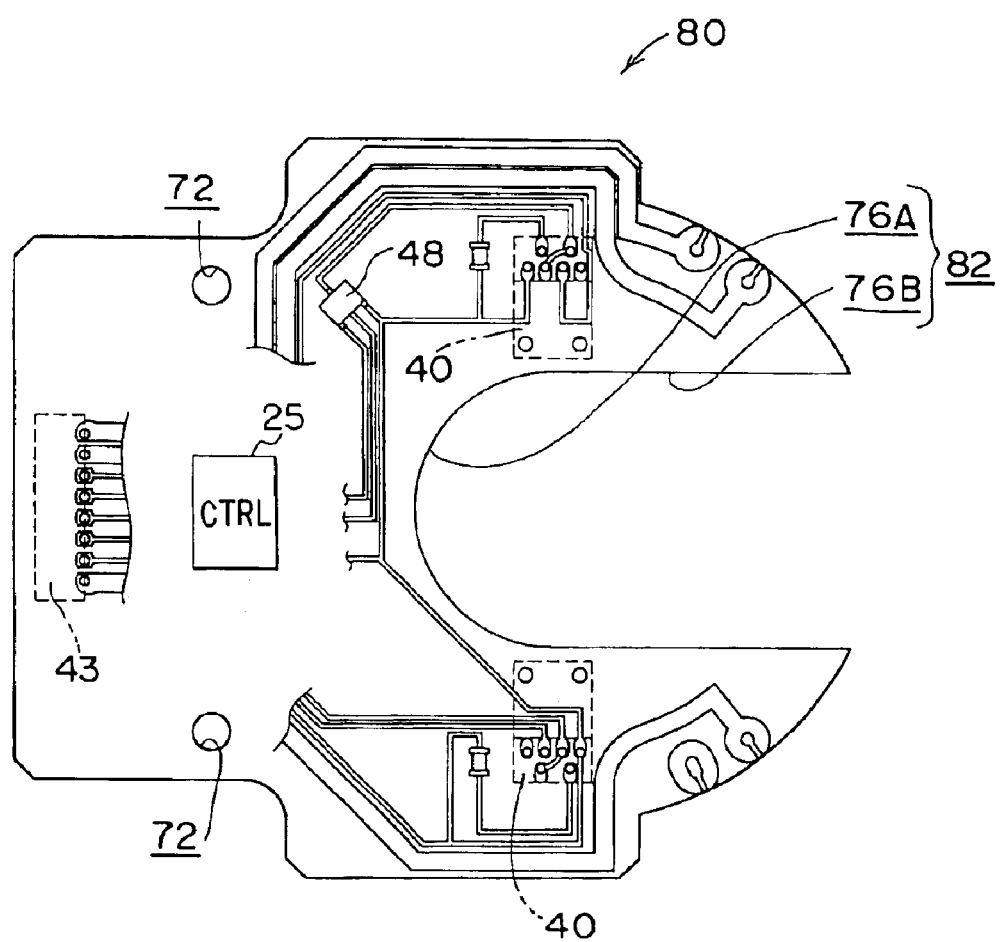
FIG. 12 is a rear view of a modification of the circuit board of the outer rotor motor of the first embodiment.

As shown in FIG. 12, the circuit board 80 has a recess (tubular portion receiving opening) 82 in place of the through hole 76. The recess 82 is recessed from an outer peripheral edge of the circuit board 80. More specifically, the recess 82 has the first semicircular part 76A and the straight part 76B. An end of the straight part 76B, which is located on a side opposite from the first semicircular part 76A, is formed as an open end. Furthermore, the recess 82 is elongated in the longitudinal direction of each sensor hole 44. With this arrangement, even in the circuit board 80, which has the relatively large surface area and has all the required electrical components, the slit forming portion of the sensor plate 36, which has the slits 36A, can be inserted between the arms 40A, 40B of each rotation sensor 40 installed to the circuit board 80. Furthermore, the circuit board 80 is also constructed to close the sensor holes 44 when the circuit board 80 is positioned in the installation position to limit intrusion of the light and foreign particles or objects into the sensor chamber 18A.

(Second Embodiment)

An outer rotor motor according to a second embodiment of the present invention will be described with reference to FIGS. 13–19. In the second embodiment, components similar to those of the first embodiment will be indicated by the similar numerals and will not be described further.

Figure 13:
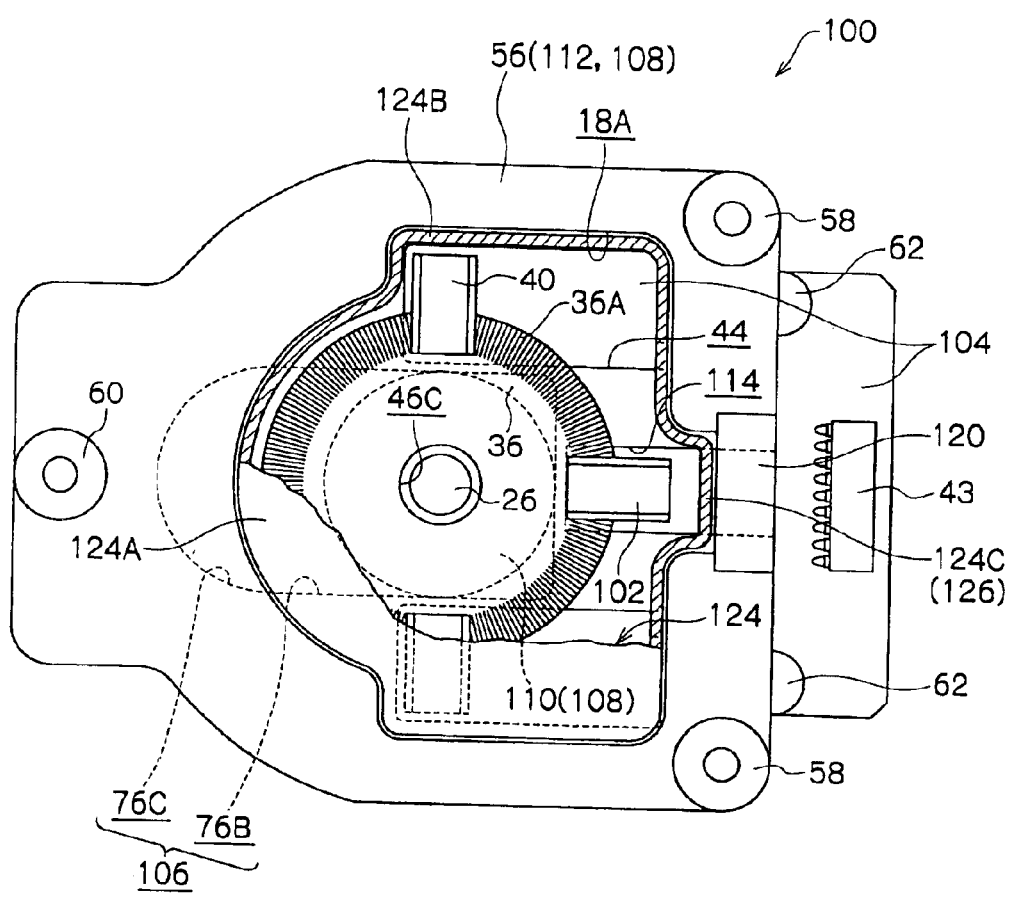
FIG. 13 is a partially fragmented front view of an outer rotor motor according to a second embodiment of the present invention.

With reference to FIG. 13, the outer rotor motor 100 of the second embodiment further includes a rotation sensor (third rotation sensor) 102 in addition to the two rotation sensors (first and second rotation sensors) 40. This feature is a major difference between the first embodiment and the second embodiment.

The rotation sensor 102 is displaced about 90 degrees from each of the rotation sensors 40, which are arranged in a symmetrical manner with respect to the output shaft 26, i.e., are displaced about 180 degrees from each other and which are received in the sensor holes 44, respectively. More specifically, the three rotation sensors 40, 102 are arranged at about 90 degree intervals along an imaginary circle, which is coaxial with the output shaft 26. Furthermore, the rotation sensor 102 is arranged on an installation preparation position side (a side opposite from an arrow B in FIG. 18) of the rotation sensors 40. Except the position of the rotation sensor 102, the rotation sensor 102 is structurally the same as that of the rotation sensors 40. Thus, in the rotation sensor 102, the slit forming portion of the sensor plate 36, which has the slits 36A, is inserted between two arms 40A, 40B of the rotation sensor 102, and a signal, which corresponds to the rotational speed of the sensor plate 36, is outputted to a control circuit 25 of a circuit board 104 described below.

Figure 14:
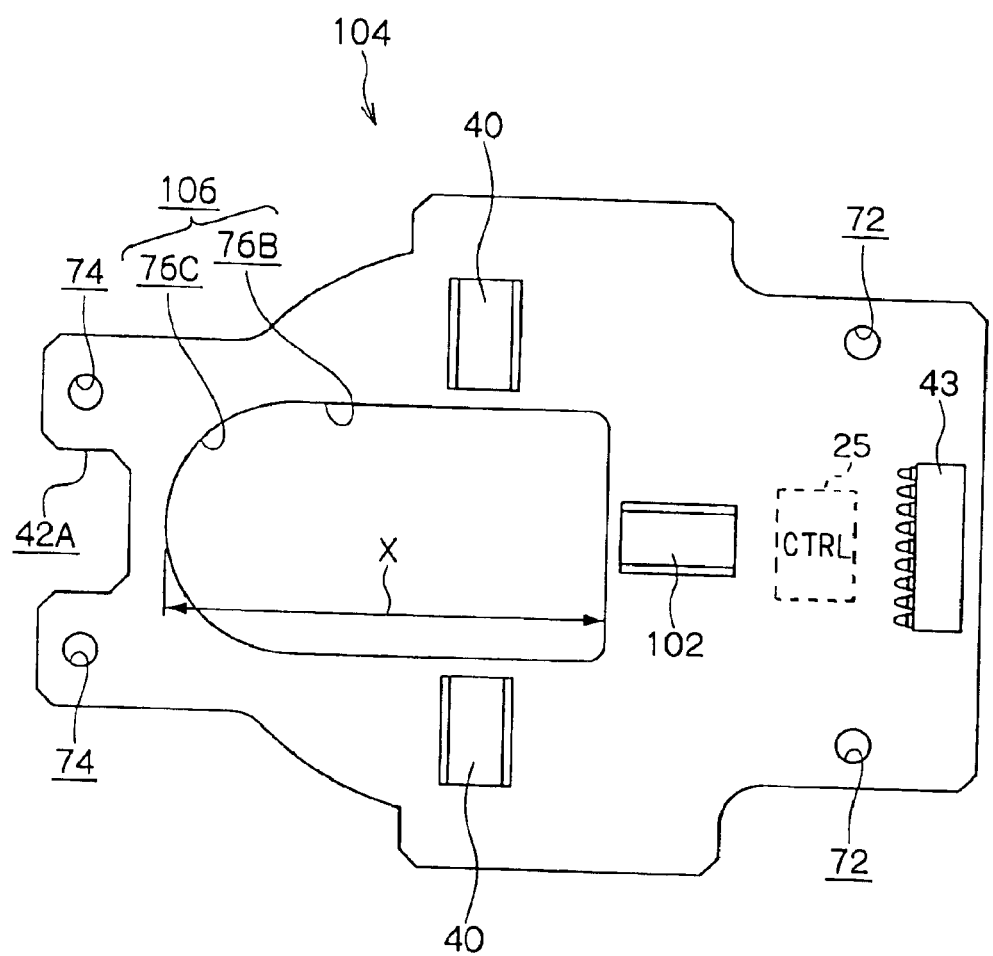
FIG. 14 is a front view of a circuit board of the outer rotor motor according to the second embodiment of the present invention.

The outer rotor motor 100 has the circuit board 104 in place of the circuit board 42. As shown in FIG. 14, the circuit board 104 has the two rotation sensors 40 and the rotation sensor 102. The circuit board 104 has a through hole (tubular portion receiving opening) 106 in place of the through hole 76. The through hole 106 has a straight part 76B, which extends further on a side opposite from the second semicircular part 76C, so that the first semicircular part 76A is eliminated in this embodiment. Furthermore, a length X of the through hole 106 satisfies $X>X'=(R^2-A^2)^{1/2}+W/2+D$. Thus, the through hole 106 differs from the through hole 76 only in the shape of the end of the through hole 106. However, the functions of the through hole 106 are substantially the same as the functions of the through hole 76.

The rotation sensor 102 is installed to the circuit board 104 at a location near a straight part 76B side end of the through hole 106 of the circuit board 104. The rotation sensor 102 is installed to the circuit board 104 in such a manner that distal ends of the arms 40A, 40B of the rotation sensor 102 are directed toward the through hole 106. Although an outer shape of the circuit board 104 slightly differs from the circuit board 42, the circuit board 104 is similar to the circuit board 42 in the fact that the circuit board 104 is installed to a stator housing 112 (described below) without substantially protruding from the stator housing 112 except a portion of the circuit board 104 around the connector 43 (FIG. 1).

Figure 15:
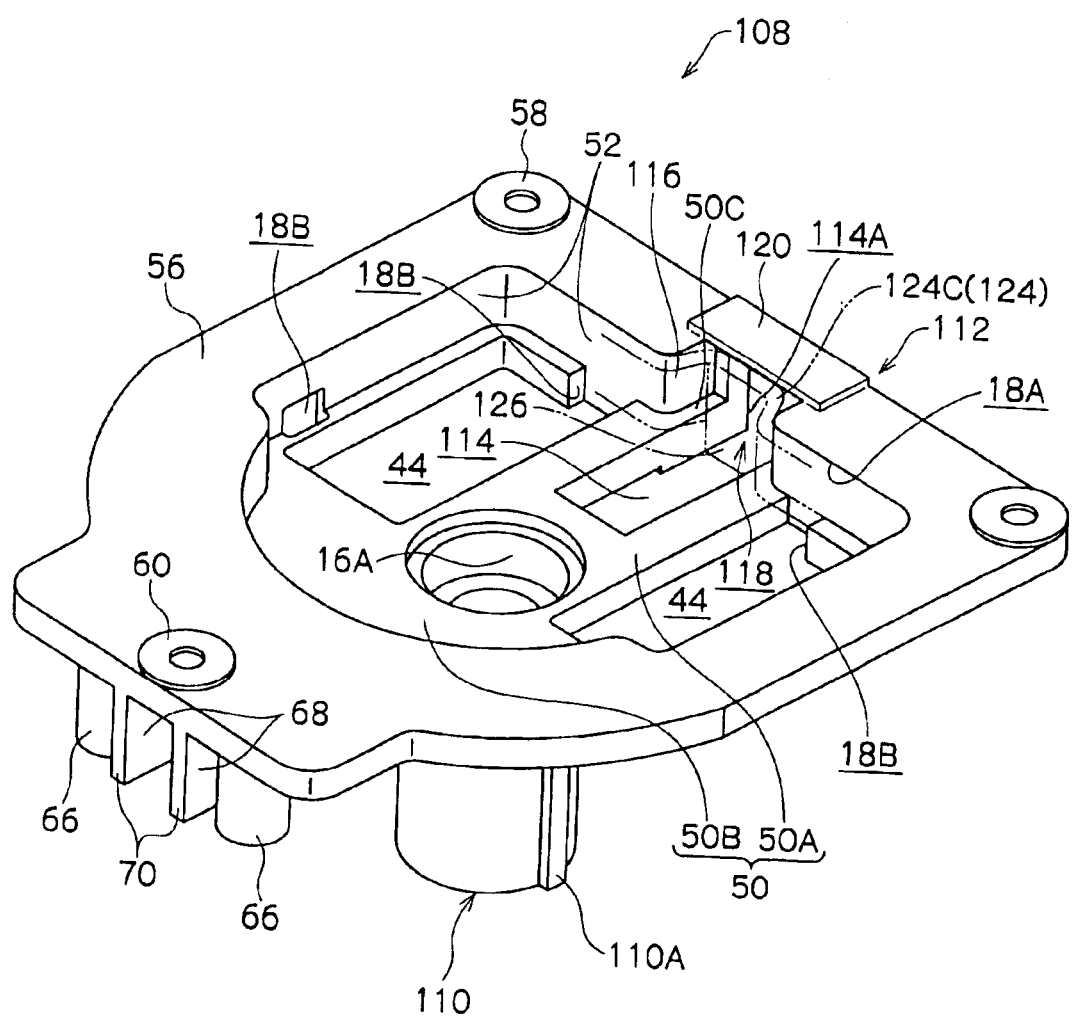
FIG. 15 is a frontal perspective view of a stator base of the outer rotor motor of the second embodiment.
Figure 16:
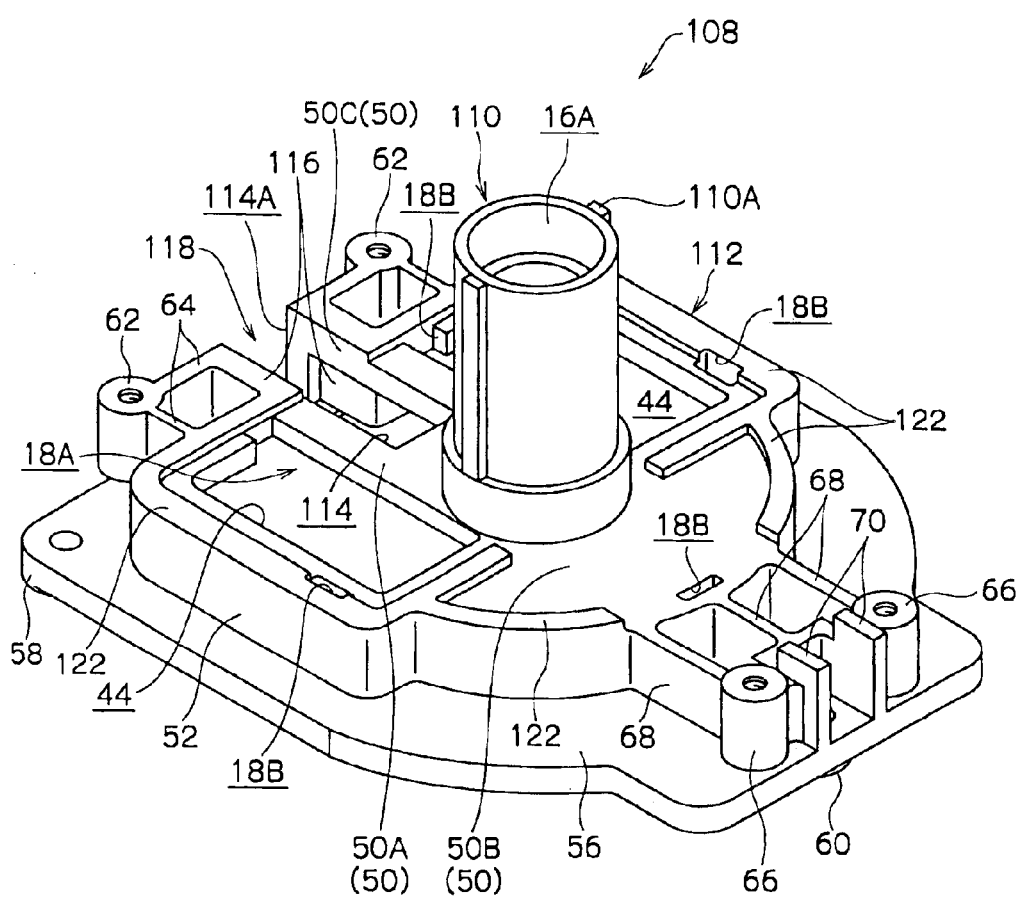
FIG. 16 is a rear perspective view of the stator base of the outer rotor motor of the second embodiment.

The outer rotor motor 100 includes a stator base 108 in place of the stator base 14. As shown in FIGS. 15–17, in the stator base 108, a center tubular portion 110 and the stator housing 112 are formed integrally. The tubular portion 110 is located on a first side of the stator housing 112 (i.e., on a first side of the stator base 108). The tubular portion 110 has the shaft hole 16A, which has the two bearings 28. The output shaft 26 is received through the shaft hole 16A and is rotatably supported by the bearings 28. Furthermore, in place of the engaging grooves 16B, the tubular portion 110 has a key 110A, which limits rotation of the stator core 20 relative to the stator core. Other than the key 110A, the tubular portion 110 is substantially the same as the tubular portion 16 of the first embodiment.

Figure 17A:
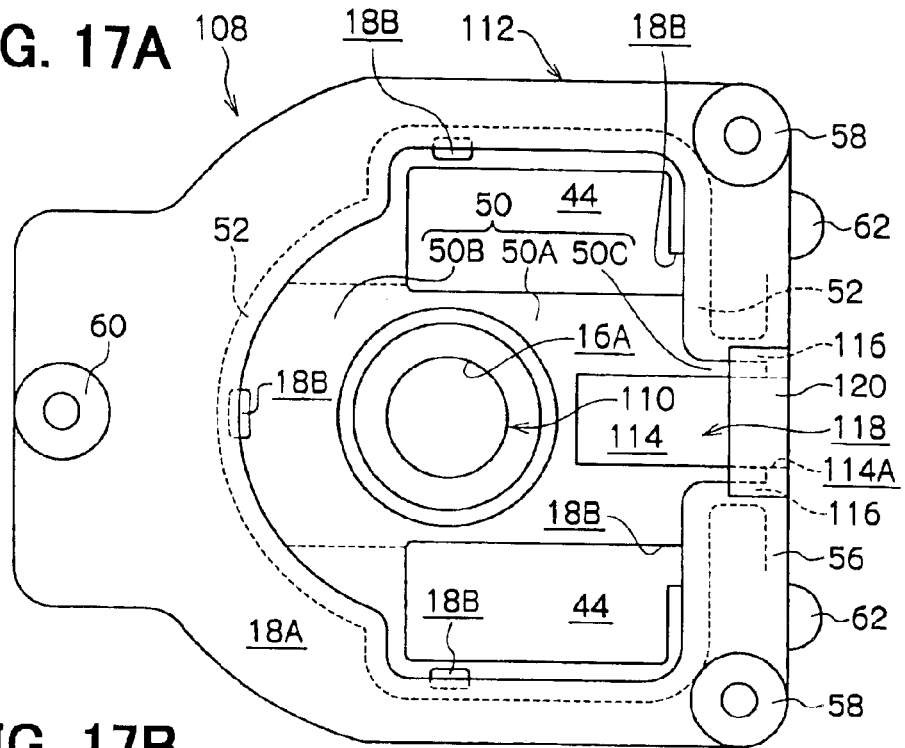
FIG. 17A is a front view of the stator base of the outer rotor motor of the second embodiment.

The stator housing 112 includes the base plate 50 and the frame wall 52. The base plate 50 has the two sensor holes (first and second sensor receiving openings) 44. The base plate 50 and the frame wall 52 are opened on a second side of the stator housing 112 (i.e., on a second side of the stator base 108), which is opposite from the tubular portion 110, i.e., which is opposite from the first side of the stator housing 112. Furthermore, the base plate 50 and the frame wall 52 form the sensor chamber 18A that is communicated with the shaft hole 16A. A sensor opening (a third sensor receiving opening) 114 is formed between the sensor holes 44 in the stator housing 112. More specifically, in the stator housing 112, as shown in FIGS. 15 and 17A, the base plate 50 has an extension plate portion 50C, which extends from the rectangular plate portion 50A on one side of the rectangular plate portion 50A opposite from the arcuate plate portion 50B. An end of the extension plate portion 50C extends to a location near a first longitudinal end of the overhang 56.

The sensor opening 114 extends from the rectangular plate portion 50A to the extension plate portion 50C and has a generally rectangular shape, which has long sides that extend parallel to the long sides of sensor holes 44. A width (i.e., a size of each short side) of the sensor opening 114 is slightly larger than a width W of the rotation sensor 102. A first longitudinal end of the sensor opening 114 forms an open end 114A at an outer edge of the extension plate portion 50C, and a second longitudinal end of the sensor opening 114 is located near the tubular portion 110.

Furthermore, in a region between the rectangular plate portion 50A and the extension plate portion 50C in the stator housing 112, the frame wall 52 is entirely notched or recessed to have a lateral opening along an entire height of the frame wall 52 together with a corresponding portion of the overhang 56. Two opposed extension walls 116 extend from notched edges, respectively, of the frame wall 52 to the open end 114A in parallel with the long sides of the sensor opening 114. Each extension wall 116 is integrated with the corresponding ribs 64, which reinforce the corresponding screw boss 62. The extension plate portion 50C is formed between the two extension walls 116. A space between the two extension walls 116 is slightly larger than the width of the sensor opening 114 but is narrowed to coincide with the width of the sensor opening 114 at a portion of the first longitudinal end of the overhang 56 where the open end 114A is located. The sensor opening 114 and a space defined between the two extension walls 116 (i.e., the lateral opening of the frame wall 52 that penetrates through the frame wall 52 in a direction perpendicular to the axial direction of the output shaft 26) will be referred to as a window 118.

Figure 18:
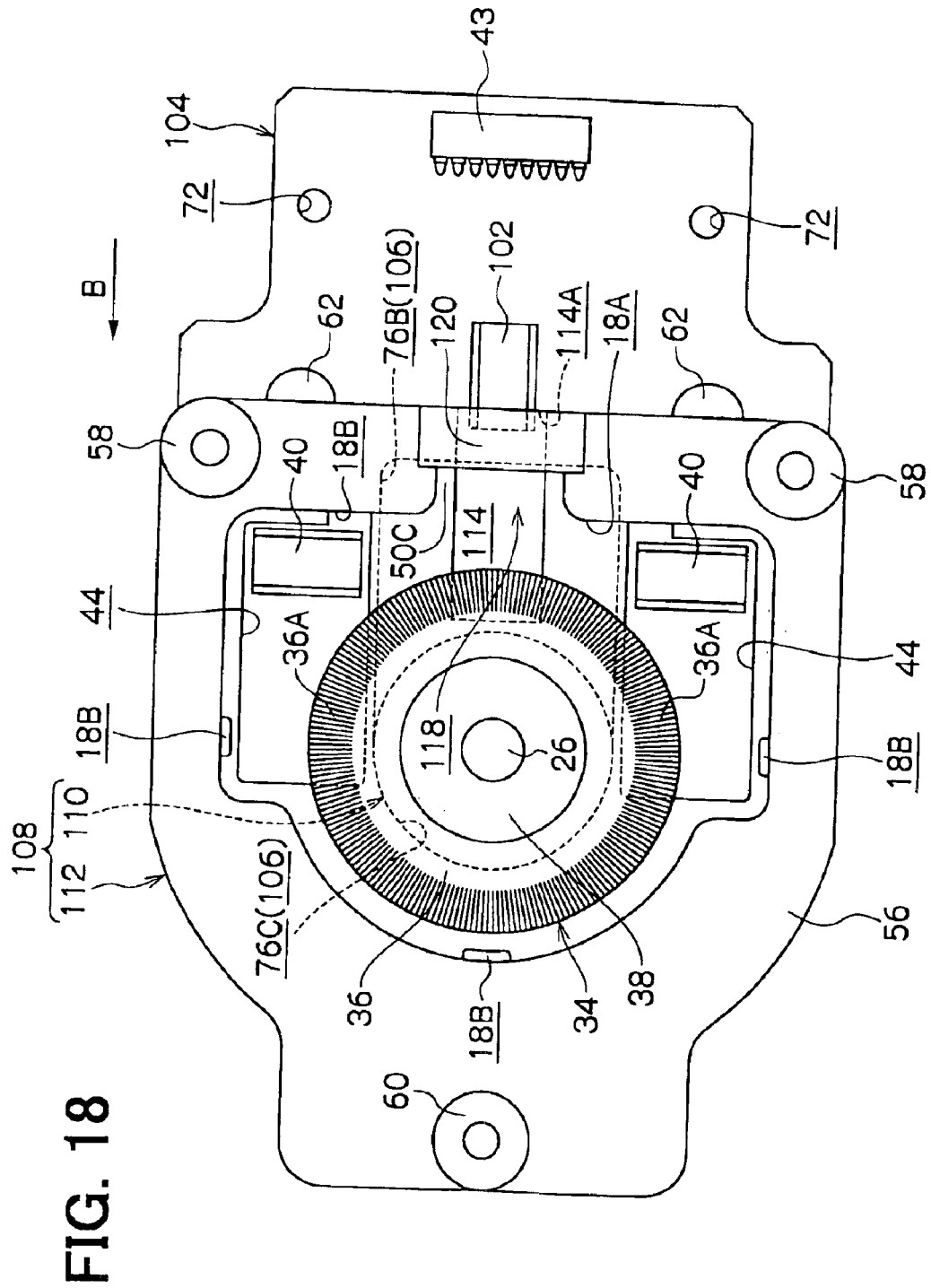
FIG. 18 is a front view showing the circuit board of the outer rotor motor of the second embodiment held in a non-interfering position.

In the above-described stator housing 112, as shown in FIG. 18, when the circuit board 104 is positioned in the non-interfering position, the rotation sensor 102 of the circuit board 104 is received in the window 118 to extend over the open end 114A. More specifically, the rotation sensor 102 held in the installation preparation position is only partially received in the window 118 (sensor opening 114). In this way, in the outer rotor motor 100, which has the third rotation sensor 102, an increase in a size of the stator housing 112 is limited. More specifically, in comparison to a case where the open end 114A of the sensor opening 114 is closed to have a structure similar to that of the sensor holes 44, it is possible to reduce a size of the stator housing 112 with the above structure.

Furthermore, the longitudinal direction of the sensor opening 114 coincides with the longitudinal direction of the through hole 106 and the longitudinal direction of each sensor hole 44. Thus, similar to the first embodiment, when the circuit board 104 located in the non-interfering position is moved in the direction of the arrow B shown in FIG. 18, the slit forming portion, which has the slits 36A, of the sensor plate 36 is received between the arms 40A, 40B of each rotation sensor 40, 102. At this time, the sensor plate 36 is inserted between the arms 40A, 40B of the two rotation sensors 40 in the tangential direction of the sensor plate 36. Furthermore, the sensor plate 36 is inserted between the arms 40A, 40B of the rotation sensor 102 in a normal direction of the sensor plate 36.

Furthermore, the stator housing 112 further includes a bridge 120, which connects between the opposed edges of the window 118. More specifically, the bridge 120 connects between open end 114A side portions of the overhang 56 (the two extension walls 116), which are located on the opposite sides, respectively, of the window 118. Also, the bridge 120 does not interfere with the rotation sensor 102 positioned in the installation preparation position. Furthermore, the amount of axial projection of the bridge 120 from the axial end surface of the overhang 56 is equal to or less than that of the connecting portion 58. It should be noted that the bridge 120 may serve as a part of the overhang 56.

Figure 17B:
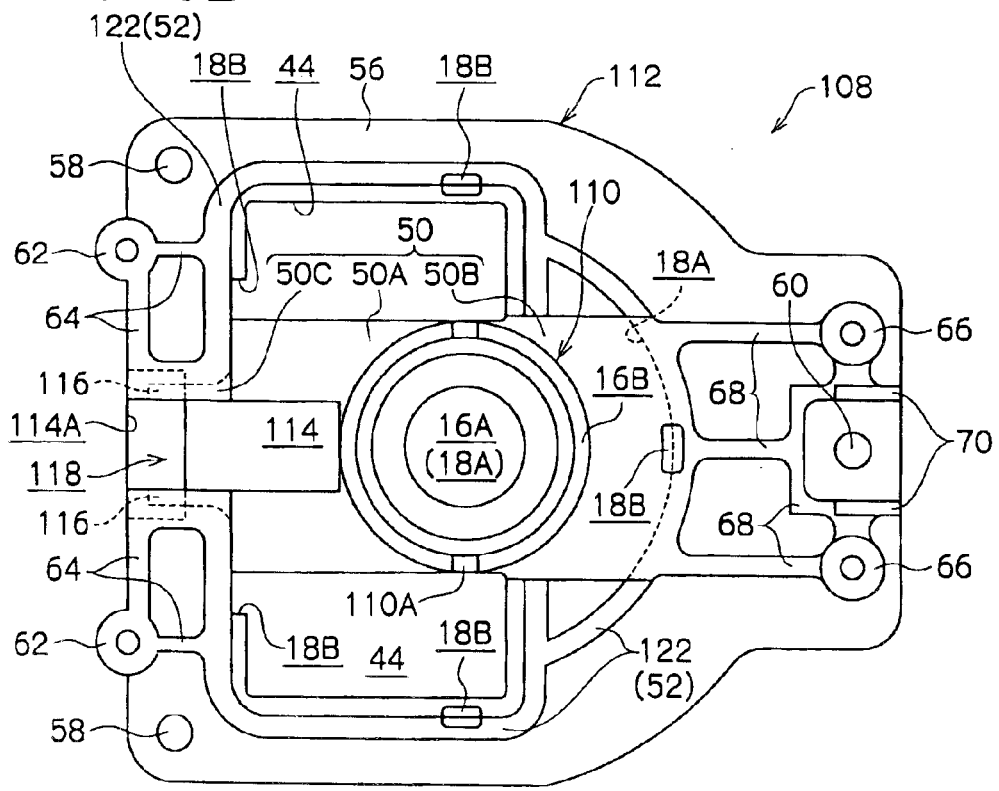
FIG. 17B is a rear view of the stator base of the outer rotor motor of the second embodiment.

In the stator housing 112, due to the provision of the sensor opening 114, the engaging hole 18B of the first embodiment located on one side of the rectangular plate portion 50A, which is opposite from the arcuate plate portion 50B, is replaced with two engaging holes 18B, each of which is provided in a corresponding one of the sensor holes 44. Furthermore, as shown in FIGS. 16 and 17B, in the stator housing 112, circuit board contact surfaces 122 are formed in place of the circuit board contact surfaces 54 of the first embodiment. Each circuit board contact surface 122 extends along the frame wall 52 and the corresponding extension wall 116 and engages the circuit board 104. Similar to the first embodiment, the circuit board contact surfaces 122 axially project in a greater amount in comparison to the rest of the base plate 50. In the second embodiment, the amount of axial projection of each circuit board contact surface 122 is substantially the same as that of each screw boss 62, that of each rib 64 and that of each screw boss 66. Furthermore, in the second embodiment, a portion of each screw boss 62 projects outwardly beyond the overhang 56 on the side opposite from the sensor chamber 18A.

The rest of the structure of the stator housing 112 is substantially the same as that of the stator housing 18 of the first embodiment. Each sensor hole 44 and the sensor opening 114 or the window 118, which includes the sensor opening 114, may be referred to as sensor installation openings. Furthermore, each sensor hole 44 and the sensor opening 114 (window 118) may be collectively referred to as a sensor accommodating opening. The bridge 120 may be referred as a bridge arrangement. Furthermore, the bridge 120 and the two extension walls 116 (including a wall thickness of the overhang 56) may be also referred as a bridge arrangement.

Figure 19:
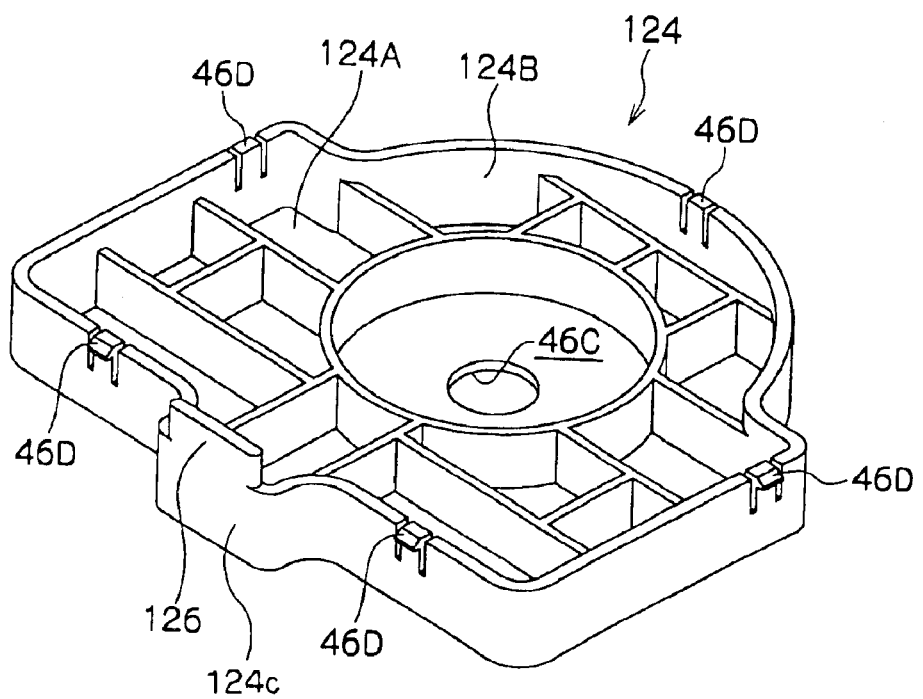
FIG. 19 is a perspective view of a cover of the outer rotor motor of the second embodiment.
Figure 21A:
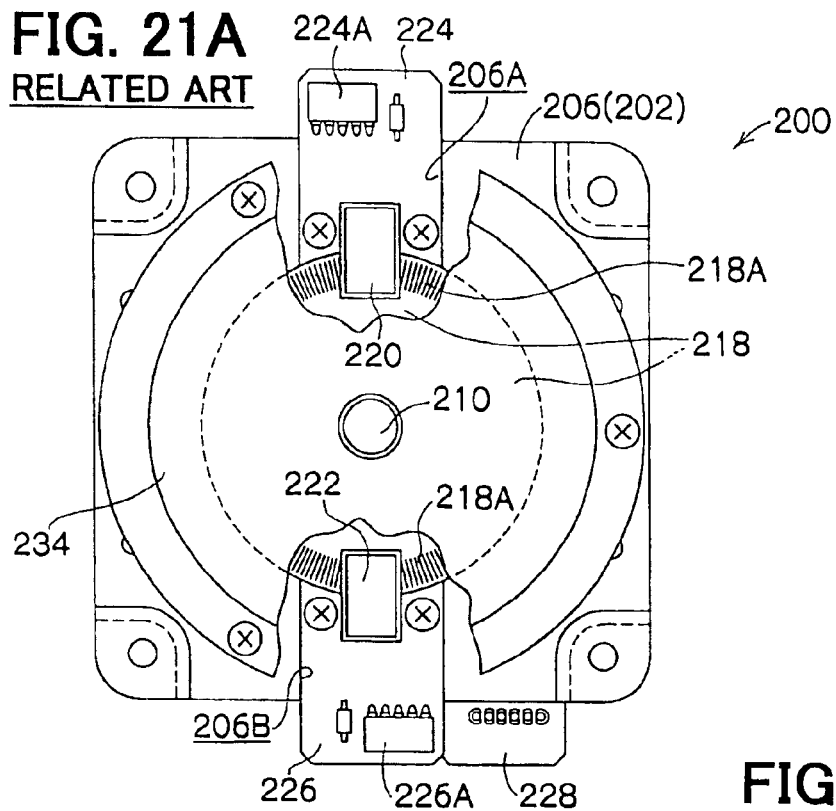
FIG. 21A is a partially fragmented front view of a previously proposed outer rotor motor.
Figure 21B:
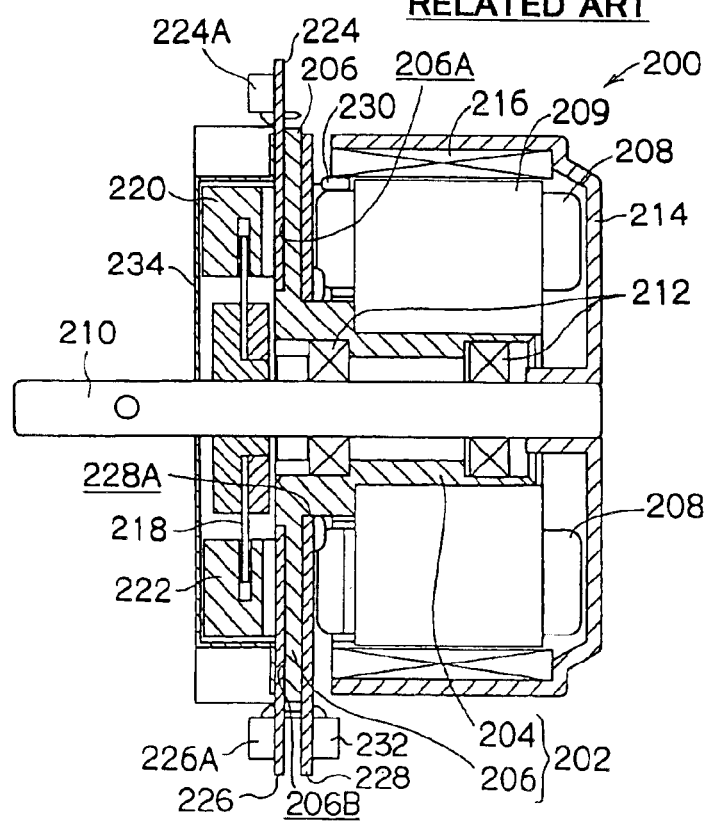
FIG. 21B is a cross sectional view of the previously proposed outer rotor motor.

As shown in FIG. 13, the open end of the sensor chamber 18A of the stator housing 112 is covered by a cover 124, which serves as a cover member and is installed to the stator housing 112. As shown in FIG. 19, the cover 124 includes a cover main body 124A and a peripheral wall 124B. The cover main body 124A has a shape that corresponds to the shape of the sensor chamber 18A when the sensor chamber 18A is viewed in a direction perpendicular to the plane of the sensor chamber 18A. The peripheral wall 124B is formed along and extends from an outer peripheral edge of the cover main body 124A in an axial direction of the outer rotor motor 100. Furthermore, the peripheral wall 124B is received in the sensor chamber 18A. The cover main body 124A and the peripheral wall 124B form a bulge 124c, which is outwardly bulged between the two extension walls 116. The bulge 124C does not interfere with the rotation sensor 102 when the rotation sensor 102 is positioned in the sensing position. More specifically, the bulge 124C is received in a space, which is defined between the two extension walls 116 and is spaced from the bridge 120. The engaging claws 46D, which are formed in the peripheral wall 124B, are engaged with the engaging holes 18B, which are formed in the stator housing 112, so that unintentional removal of the cover 124 is effectively limited.

A closure projection 126, which serves as a closing portion, axially projects from an axial end surface of the peripheral wall 124B in the bulge 124C of the cover 124. A width of the closure projection 126 corresponds to the width of the sensor opening 114, and a projecting height of the closure projection 126 corresponds to a depth of the sensor accommodating opening (i.e., a distance from a sensor chamber 18A side surface of the extension plate portion 50C to the circuit board contact surface 122). With this arrangement, when the cover 124 is installed to the stator housing 112, the closure projection 126 is received in the sensor opening 114 to laterally cover the sensor opening 114. Furthermore, as indicated by an imaginary line in FIG. 15, the closure projection 126 of the cover 124 laterally closes the sensor opening 114, and the bulge 124C of the cover 124 laterally closes the rest of the window 118.

Furthermore, in the outer rotor motor 100, functions of the control circuit 25 of the circuit board 104 differ from those of the control circuit 25 of the outer rotor motor 10. The control circuit 25 of the circuit board 104 receives output signals of the three rotation sensors 40, 102 and more precisely controls the rotation of the output shaft 26 by further reducing an measurement error of the rotational speed based on the output signals of the three rotation sensors 40, 102. This will be more specifically described below.

The measurement error, which is caused by a degree of the assembling accuracy (a degree of deviation of the rotational axis or a degree of deviation of the angle) of the code wheel 34 relative to the output shaft 26, is a sine wave like error component, which has a period per rotation of the output shaft 26 (hereinafter referred to as a single periodic component). The single periodic component can be substantially cancelled by taking an average value of output signals of the two rotation sensors 40, which are displaced by about 180 degrees from each other. However, when the sensor plate 36 is made of a resin material, such as polyethylene terephthalate (PET), which shows different expansion coefficients in two orthogonal directions, respectively, the circular sensor plate 36 may be deformed into an oblong shape in a high temperature environment (e.g., in 70 degree Celsius environment). In such a case, the measurement error will be a sine wave like error component, which has two periods per rotation of the output shaft 26 (hereinafter referred to as a double periodic component). The double periodic component cannot be cancelled by taking the average value of the output signals of the two rotation sensors 40.

Thus, in the second embodiment, the control circuit 25 obtains a first correction signal, which cancels the double periodic component, by averaging the output signal of the rotation sensor 40 and the output signal of the rotation sensor 102, which is displaced about 90 degrees from each rotation sensor 40. Furthermore, the control circuit 25 obtains a second correction signal, which cancels the double periodic component, by obtaining a difference between the output signals of the two rotation sensors 40, which are displaced about 180 degrees from each other. Then, the control circuit 25 coincides a phase and an amplitude of the single periodic component of the first correction signal with a phase and an amplitude of the single periodic component of the second correction signal and obtains a difference between the first correction signal and the second correction signal to sense the real rotational speed (actual rotational speed) of the sensor plate 36, i.e., the output shaft 26. A result, which would be obtained by the above method, would be obtained by another method. In the outer rotor motor 100 of the present embodiment, which has the three rotation sensors 40, 102 and the control circuit 25, even when the sensor plate 36 is made of polyethylene terephthalate (PET) that is an inexpensive material, the rotational speed of the output shaft 26 can be relatively accurately measured, and the output shaft 26 can be more precisely controlled with respect to the preset rotational speed.

Next, advantages of the second embodiment will be described.

In the outer rotor motor 100, when the coils 22 are energized, the rotor 24, the output shaft 26 and the code wheel 34 are rotated together. At this time, the rotation sensors 40, 102 output on/off signals (pulse signals), which correspond to the rotational speed of the code wheel 34, i.e., the rotational speed of the sensor plate 36, to the control circuit 25 installed to the circuit board 104.

The control circuit 25 compares the computed result with the preset rotational speed (preset rotational speed). Here, the computed result is obtained by canceling the single periodic component and the double periodic component using the signals inputted from each rotation sensor 40, 102 and is used as the actual rotational speed of the sensor plate 36, i.e., of the output shaft 26. Then, the control circuit 25 changes or maintains the power supply pattern to the coils 22 in such a manner that the actual rotational speed of the output shaft 26 (the average value of the rotational speed measurement) coincides with the preset rotational speed. In this way, the rotational speed of the output shaft 26, to which the code wheel 34 is secured, is maintained at the preset rotational speed.

As discussed above, the outer rotor motor 100 has the three rotation sensors 40, 102, which are arranged at about 90 degree intervals along the imaginary circle that is coaxial with the output shaft 26. Furthermore, the control circuit 25 of the outer rotor motor 100 cancels both of the single periodic component and the double periodic component of the rotation of the sensor plate 36 based on the output signals of the three rotation sensors 40, 102. Thus, even in the case where the rotational axis of the sensor plate 36 is deviated from the rotational axis of the output shaft 26 or even in the case where the sensor plate 36 is angularly deviated from the output shaft 26, and thus the sensor plate 36 is elliptically deformed, the actual rotational speed of the output shaft 26 can be more accurately measured. The control of the power supply pattern to the coils 22, i.e., the control of the rotational speed of the output shaft 26 is performed based on the more accurate measurement result, so that output shaft 26 is reliably and stably rotated at the preset rotational speed even when the sensor plate 36 is made of polyethylene terephthalate (PET).

At the time of assembling the outer rotor motor 100, the output shaft 26, to which the code wheel 34 is secured, is installed to the tubular portion 110 and is supported by the tubular portion 110 through the bearings 28, so that the code wheel 34 is installed in the sensor chamber 18A of the stator base 108. In the assembly, the circuit board 104 is moved toward the circuit board contact surfaces 122 while the installation surface of the circuit board 104, to which the rotation sensors 40, 112 are installed, is directed to the circuit board contact surfaces 122 of the stator base 108. Thus, the tubular portion 110 is received through the through hole 106 of the circuit board 104.

Next, a half of the tubular portion 110 is positioned in the second semicircular part 76C of the through hole 106. Then, the circuit board 104 is moved toward the circuit board contact surfaces 122 in the axial direction of the tubular portion 110, and each rotation sensor 40 is received through the corresponding sensor hole 44 of the stator housing 112 to place the rotation sensor 40 in the sensor chamber 18A. Also, at this time, a portion of the rotation sensor 102 is inserted into the window 118 through the sensor opening 114. In this way, as shown in FIG. 18, the circuit board 104 is placed in the non-interfering position where each rotation sensor 40, 102 is positioned in the installation preparation position.

Next, the circuit board 104 is moved in a direction of an arrow B in FIG. 18 along the circuit board contact surfaces 122 while the second semicircular part 76C side end of the circuit board 104 serves as a leading end of the circuit board 104. Thus, each rotation sensor 40 is moved along the corresponding tangent line, which is tangent to the circle of the sensor plate 36, and the rotation sensor 102 is moved along the normal line of the circle of the sensor plate 36. Thus, the slit forming portion, which has the slits 36A, of the sensor plate 36 is received between the arm 40A and the arm 40B of each rotation sensor 40, 102. That is, the sensor plate 36 is relatively moved toward the rotation sensor 40 in the tangent direction of the sensor plate 36, and the sensor plate 36 is received between the arm 40A and the arm 40B through the lateral opening defined between the arm 40A and the arm 40B. Also, at this time, the sensor plate 36 is moved toward the rotation sensor 102 in the normal direction of the sensor plate 36 and is received between the arm 40A and the arm 40B of the rotation sensor 102 through a distal end opening defined between the arm 40A and the arm 40B of the rotation sensor 102.

When the circuit board 104 reaches the installation position where each rotation sensor 40, 102 is in the corresponding sensing position, the limiting walls 70 of the stator base 108 engage the recess 42A of the circuit board 108, and the circuit board 104 is temporarily held by the stator base 108, i.e., is temporarily positioned. At this time, the tubular portion 110 is received through the end of the straight part 76B of the through hole 106, which is opposite from the second semicircular part 76C. Then, the screws are threaded into the screw bosses 62, 66 of the stator base 108 through the through holes 72, 74, and the circuit board 104 is engaged with the circuit board contact surfaces 122 and each screw boss 62, 66 to secure the circuit board 104 to the stator base 108. In this way, the circuit board 104 is precisely positioned relative to the stator base 108, and the rotation sensors 40, 102 are arranged at about 90 degree intervals along the imaginary circle, which is coaxial with the output shaft 26.

Thereafter, the cover 124 is installed to the stator housing 112 of the stator base 108 to engage with the axial end of the frame wall 52. Specifically, the peripheral wall 124B of the cover 124 is inserted into the sensor chamber 18A, and the engaging claws 46D of the peripheral wall 124B are engaged with the engaging holes 18B of the stator base 108. In this way, the cover 124 is connected to the stator base 108 in a manner that limits unintentional removal of the cover 124 from the stator housing 112. In this connected state, the closure projection 126 laterally closes the sensor opening 114, and the bulge 124C (more specifically, a portion of the peripheral wall 124B) laterally closes the rest of the window 118. Thus, it is possible to limit intrusion of the light and foreign particles or objects from the open end 114A side into the sensor chamber 18A through the window 118 of the stator housing 112.

The stator core 20, around which the coils 22 are wound, is secured to the tubular portion 110. Then, the coils 22 and the circuit board 104 are electrically connected together. Furthermore, the boss 30C of the rotor housing 30, to which the magnets 32 are secured, is secured to the output shaft 26.

In this way, the assembly (manufacturing) of the outer rotor motor 100 is completed.

As discussed above the circuit board 104, which has the rotation sensors 40, 102, has the through hole 106, through which the tubular portion 110 is received. Thus, the single circuit board 104 can provide a relatively large surface area while a size of the circuit board 104 is not substantially increased in any specific direction relative to the tubular portion 110, and the amount of the protrusion from the overhang 56 is minimized.

In the state where the through hole 106 receives the tubular portion 110, the through hole 106 allows the movement of the circuit board 104 between the non-interfering position and the installation position. More specifically, the length X of the through hole 106 satisfies the condition of $X>(R^2-A^2)^{1/2}+W/2+D$. Thus, while the relatively large surface area of the circuit board 104 is maintained, the circuit board 104, which has the rotation sensors 40, 102, each of which has the arms 40A, 40B for receiving the sensor plate 36 therebetween, can be installed to the stator 12. Particularly, the through hole 106 is formed as the elongated hole, so that a loss of the surface area of the circuit board 104 is reduced in comparison to a case where the through hole is formed as a circular through hole, which has a diameter that is equal to the length X. Thus, it is easy to provide the sufficient surface area of the circuit board 104.

With the above structure, the single circuit board 104 has all the required electrical components, such as the rotation sensors 40, 102, the Hall element 48 and the control circuit (control element or device) 25, which are required to drive and control the outer rotor motor 100.

Furthermore, each of the sensor hole 44 and the sensor opening 114 of the stator housing 112, through which the corresponding rotation sensor 40, 102 is projected into the sensor chamber 18A, allows movement of the circuit board 104 between the non-interfering position and the installation position. More specifically, the longitudinal size Y of each sensor hole 44 satisfies the condition of $Y>(R^2-A^2)^{1/2}+3\times W/2$. Furthermore, the sensor opening 114 has the open end 114A, and only a portion of the rotation sensor 102 positioned in the installation preparation position is received in the window 118. Thus, the circuit board 104 is positioned in the tubular portion 110 side, i.e., the rotor 24 side of the stator housing 112. Thus, the electrical connection between the circuit board 104 and the coils 22 is eased, and there is no substantial limitation on the positioning of the Hall element 48.

Furthermore, in the manufacturing method of the outer rotor motor 100, the step of inserting the tubular portion 110 into the through hole 106 and moving the circuit board 104 toward the circuit board contact surfaces 122 of the stator housing 112 is separated from the step of moving the circuit board 104 along the circuit board contact surfaces 122 to insert the sensor plate 36 between the arms 40A, 40B of each rotation sensor 40, 102 while avoiding an interference between the circuit board 104 and the tubular portion 110 by the provision of the through hole 106. Because of the separation of the above steps, the single circuit board 104, which has the relatively large surface area and has the rotation sensors 40, 102, can be installed to the stator 12 in such a manner that the sensor plate 36 is inserted between the arms 40A, 40B of each rotation sensor 40, 102. That is, because of the separation of the above steps, all the required electrical components can be installed to the single circuit board 104. Particularly, the movement of the circuit board 104 along the circuit board contact surfaces 122 of the stator housing 112 causes insertion of the sensor plate 36 between the arms 40A, 40B of each rotation sensor 40 in the tangential direction of the sensor plate 36 and also between the arms 40A, 40B of the rotation sensor 102 in the normal direction of the sensor plate 36. Thus, the simple linear movement of the circuit board 104 along the circuit board contact surfaces 122 of the stator housing 112 in the direction of the arrow B allows the positioning of the sensor plate 36 between the arms 40A, 40B of each of the three rotation sensors 40, 102, which are installed to the circuit board 104 at about 90 degree intervals.

As described above, in the outer rotor motor 100 and the manufacturing method of the outer rotor motor 100, the sufficient surface area of the circuit board 104, to which the three rotation sensors 40, 102 are installed, is achieved, and the sensor plate 36 is received between the arms 40A, 40B of each rotation sensor 40, 102 at the time of assembling the circuit board 104 to the stator 12.

Furthermore, in the outer rotor motor 100, the sensor accommodating opening, which allows projection of the three rotation sensors 40, 102 installed to the circuit board 104 that is placed on the tubular portion 110 side of the stator housing 112, is formed by the two sensor holes 44 and the sensor opening 114, each of which receives the corresponding rotation sensor 40, 102. Thus, sufficient rigidity of the stator housing 112 can be achieved.

Also, in the outer rotor motor 100, the sensor opening 114 has the open end 114A. Thus, in comparison to a case where the sensor opening 114 is replaced with a sensor hole similar to the sensor hole 44, a size of the stator housing 112 is advantageously reduced. That is, in the case of the rotation sensor 102, which is moved toward the sensor plate 36 in the normal direction of the sensor plate 36 that coincides with the longitudinal direction of the rotation sensor 102, the rotation sensor 102 requires a moving distance that is longer than the length Y of the sensor hole 44. However, the provision of the open end 114 allows access or installation of the rotation sensor 102 to the sensor chamber 18A from the outside of the stator housing 112, so that an increase in the size of the stator housing 112 is advantageously limited. As a result, in one modification, the rotation sensor 102, which is located in the installation preparation position, can be entirely placed outside of the stator housing 112, and the rotation sensor 102 may be moved from the installation preparation position to the sensing position through the open end 114A at the time of moving the circuit board 104 from the non-interfering position to the installation position. The stator housing 112 of the second embodiment has a size that is substantially the same as the stator housing 18 of the first embodiment when each stator housing 18, 112 is viewed in a direction perpendicular to the plane of the stator housing 18.

The bridge 120 is provided to connect between the opposed edges located in the open end 114A of the sensor opening 114 through the two extension walls 116 (and the wall thickness of the overhang 56). Thus, it is possible to limit a reduction in the rigidity of the stator housing 112, which has the open end 114A of the sensor opening 114. Thus, in addition to the fact that the sensor opening 114 is provided separately from each sensor hole 44, the above arrangement allows achievement of the sufficient rigidity of the stator housing 112.

Furthermore, the provision of the closure projection 126 in the cover 124 allows the covering of the sensor opening 114, which has the open end 114A. Also, the circumferentially extending peripheral wall 124B of the cover 124 closes a portion between the two extension walls 116 of the opening 118, and the cover main body 124A closes the open end of the sensor chamber 18A. Furthermore, the circuit board 104 located in the installation position closes the sensor holes 44 and the sensor opening 114 from the tubular portion 110 side of the stator housing 112. Because of the above structure, it is possible to limit intrusion of the light and foreign particles or objects into the sensor chamber 18A through the sensor holes 44 and the sensor opening 114 and the axial open end of the sensor chamber 18A. Therefore, it is possible to limit erroneous measurements of the rotational speed of the output shaft 26 through the rotation sensors 40, 102, which are optical sensors (photo-interrupters). Furthermore, since the closure projection 126 is formed integrally with the cover 124, the open end 114A of the sensor opening 114, which is not required after the assembly of the motor 100 and which could serve as an intrusion passage of the foreign particles or objects, can be effectively closed by the closure projection 126 without increasing the number of the components.

Next, the invention will be described with reference to a case where the outer rotor motors 10, 100 of the above embodiments are applied to an image processing apparatus (image forming apparatus), such as a color printer or a color copy machine.

As shown in FIG. 20, the image processing apparatus includes four photoconductor drums 130, 132, 134, 136, which correspond to red, blue, yellow and black, respectively. Each photoconductor drum 130, 132, 134, 136 rotates about its axis to transfer a formed toner image to a transfer body.

Each photoconductor drum 130, 132, 134, 136 is connected with the corresponding outer rotor motor 10, 100, which serves as a rotational drive means. Specifically, the output shaft 26 of each outer rotor motor 10, 100 is directly connected to the corresponding photoconductor drum 130, 132, 134, 136.

In each outer rotor motor 10, 100, the stator 12 (stator housing 18, 112) is secured to a housing 138 of the image processing apparatus. When the coils 22 are energized, the rotor 24 is rotated in a predetermined direction to rotate the corresponding photoconductor drum 130, 132, 134, 136.

In this instance, the outer rotor motor 10, 100 is small and generates a high torque in a low rotational speed range. Thus, even when the outer rotor motor 10, 100 is connected to the photoconductor drum 130 or the like, the outer rotor motor 10, 100 can drive the photoconductor drum 130 or the like with the sufficient torque. Thus, it is not required to increase a size of the image processing apparatus. Particularly, the outer rotor motor 10, 100 has a low profile structure, so that the outer rotor motor 10, 100 can be advantageously placed in a narrow space at a back side (axial end) of the photoconductor drum 130 or the like. Furthermore, the outer rotor motor 10, 100 is the brushless motor, which includes the magnet rotor, so that the outer rotor motor 10, 100 can be manufactured at the low costs, to avoid an increase in the costs of the image processing apparatus.

when the compact high torque outer rotor motor 10, 100 is directly connected to the photoconductor drum 130 or the like, it is not required to drive the photoconductor drum 130 or the like through, for example, a gear belt. Thus, fluctuations in the rotation of the photoconductor drum 130 or the like can be limited to allow an improvement in an image quality. That is, a higher resolution of the image processing apparatus is possible.

Particularly, the outer rotor motor 10 has the two rotation sensors 40, and the rotational speed of the output shaft 26, i.e., the rotational speed of the photoconductor drum 130 or the like is controlled with the high accuracy. Thus, fluctuations in the rotation of the photoconductor drum 130 or the like is advantageously further limited. Furthermore, the outer rotor motor 100 has the three rotation sensors 40, 102, and the rotational speed of the output shaft 26, i.e., the rotational speed of the photoconductor drum 130 or the like is controlled with the higher accuracy. Thus, fluctuations in the rotation of the photoconductor drum 130 or the like is advantageously further limited.

In the outer rotor motor 10, 100, which is directly connected to and rotates the photoconductor drum 130 or the like of the image processing apparatus, fluctuations in the rotation of the photoconductor drum 130 or the like can be limited without increasing a size and manufacturing costs of the image processing apparatus.

Furthermore, in each of the above embodiments and the modification, the outer rotor motor 10, 100 includes the two rotations sensors 40 or the three rotation sensors 40, 102. However, the present invention is not limited to this structure, and thereby the outer rotor motor can have only one rotation sensor 40 or 102. In such a case, the structure of the outer rotor motor is not limited to insert the slit forming portion, which has the slits 36A, of the sensor plate 36 between the arms 40A, 40B of the rotation sensor 40 in the tangential direction. For example, the sensor plate 36 can be inserted between the arms 40A, 40B of the rotation sensor 40 in the normal direction or a direction that is perpendicular to the normal direction (i.e., moving the rotation sensor 40 along the center line CL to inset the sensor plate 36 between the arms 40A, 40B). Similarly, the sensor plate 36 can be inserted between the arms 40A, 40B of the rotation sensor 102 in the tangential direction or a direction perpendicular to the tangential direction. That is, the longitudinal direction of the through hole 76, 106 or of the recess 82 or the moving direction of the rotation sensor 40, 102 in the sensor hole 44 or the sensor opening 114 can be in a direction perpendicular to the direction of the arrow B or in a direction that crosses the direction of arrow B at any angle in FIGS. 9–11 and 18.

In the above embodiments, the stator housing 18, 112 of the stator base 14, 108 has the sensor holes 44. However, the present invention is not limited to this. For example, similar to the sensor opening 114 or the recess 82, which is the modification of the through hole 76, each sensor hole 44 can be replaced with a recess, which has an open end. Furthermore, the sensor opening 114 can be modified to a sensor hole, which has no open end 114A, like the sensor hole 44. Also, the two sensor holes 44 of the stator housing 18 can be connected together to have a single sensor accommodating opening. In addition, the two sensor holes 44 and the sensor opening 114 of the stator housing 112 can be connected together to have a single sensor accommodating opening. Furthermore, the circuit board 42, 104 can be placed on the sensor chamber 18A side of the base plate 50, and the circuit board 42, 104 can be electrically connected to the coils through a hole that extends through the base plate 50, and/or the Hall element 48 can be placed adjacent the magnets 32.

Furthermore, in the above embodiments, the through hole 76, 106 is formed as the elongated hole. However, the through hole 76, 106 can have any other shape as long as the through hole 76, 106 allows movement of the circuit board 42, 104 between the installation position and the non-interfering position. Also, in the outer rotor motor 100 of the second embodiment, the rotation sensor 102 can be provided in the circuit board 80 of FIG. 12, which has the recess 82 in place of the through hole 106.

In the above embodiments and the modification, the circuit board 42, 80, 104 closes the sensor holes 44 and the sensor opening 114 when the circuit board 42, 80, 104 is placed in the installation position. However, the present invention is not limited to this arrangement. For example, it is possible that the circuit board 42, 80, 104 does not close the sensor holes 44 or the like in the installation position. In such a case, it is desirable to close the sensor holes 44 or the like with a separate cover member or the like.

In the second embodiment, the bridge 120 connects the edges of the open end 114A of the sensor opening 114 of the stator housing 112. However, the present invention is not limited to this. For example, the bridge 120 can be eliminated from the stator housing 112. Furthermore, in the second embodiment, the closure projection 126 is provided in the cover 124. However, the present invention is not limited to this. For example, the open end 114A can be closed by a separate member. In this case, this member can be connected to the circuit board 104.

It the above embodiments and the modification, the control circuit 25 is installed in the circuit board 42, 80, 104. However, it should be noted that the control circuit 25 can be placed in any other place within the outer rotor motor 10, 100, if desired. Furthermore, in some cases, the control circuit 25, can be placed outside of the outer rotor motor 10, 100.

Additional advantages and modifications will readily occur to those skilled in the art. The invention in its broader terms is therefore not limited to the specific details, representative apparatus, and illustrative examples shown and described.

What is claimed is:

1. An electric motor comprising:

a rotor that is rotated upon energization of the electric motor;

an output shaft that is secured to the rotor to rotate integrally with the rotor;

a circular sensor plate that is secured to the output shaft to rotate integrally with the output shaft;

a stator that has a stator base, which includes a tubular portion, wherein the tubular portion has a shaft hole, and the shaft hole penetrates through the tubular portion in an axial direction of the output shaft and rotatably receives the output shaft; and a circuit board that is secured to the stator base and includes at least one rotation sensor, which outputs a signal that corresponds to a rotational speed of the sensor plate, wherein each rotation sensor includes two opposed arms, which are spaced from each other in a direction parallel to the axial direction of the output shaft and receives a portion of the sensor plate between the opposed arms, and wherein the circuit board has a tubular portion receiving opening, which penetrates through the circuit board in the axial direction of the output shaft to receive the tubular portion of the stator base and which is elongated in a direction perpendicular to the axial direction of the output shaft, so that at least a portion of an inner peripheral edge of the tubular portion receiving opening is spaced away from the tubular portion.

2. The electric motor according to claim 1, wherein:

the stator base further includes a base plate, which extends from a base end of the tubular portion in a direction perpendicular to the axial direction of the output shaft;

the base plate has at least one sensor receiving opening, which penetrates through the base plate from a first side to a second side of the base plate in a direction parallel to the axial direction of the output shaft to receive a corresponding one of the at least one rotation sensor, wherein each sensor receiving opening is elongated in a direction parallel to a longitudinal direction of the tubular portion receiving opening of the circuit board;

the tubular portion and the circuit board are located on the first side of the base plate;

the sensor plate is located on the second side of the base plate; and each rotation sensor protrudes from the corresponding sensor receiving opening on the second side of the base plate to receive the portion of the sensor plate between the opposed arms of the rotation sensor.

3. The electric motor according to claim 2, wherein the tubular portion receiving opening of the circuit board is in a form of an elongated through hole, which penetrates through the circuit board in the axial direction of the output shaft and is spaced from an outer peripheral edge of the circuit board.

4. The electric motor according to claim 3, wherein:

the base end of the tubular portion has a circular cross section; and the tubular portion receiving opening is in a form of a racetrack-shaped through hole, which has a first semicircular part, a straight part and a second semicircular part, which are arranged in this order in the longitudinal direction of the tubular portion receiving opening.

5. The electric motor according to claim 3, wherein:

the at least one sensor receiving opening of the base plate includes a plurality of sensor receiving openings; and the at least rotation sensor includes a plurality of rotation sensors.

6. The electric motor according to claim 5, wherein:

the plurality of sensor receiving openings of the base plate includes two sensor receiving openings, wherein each sensor receiving opening is in a form of an elongated through hole, which penetrates through the base plate in the direction parallel to the axial direction of the output shaft and is spaced away from an outer peripheral edge of the base plate;

the plurality of rotation sensors includes two rotation sensors, which are substantially identical to each other and are arranged in a symmetrical manner with respect to a rotational axis of the output shaft, wherein each rotation sensor has a generally rectangular cross section that includes two long sides and two short sides, and each short side of the rotation sensor is parallel to the longitudinal direction of the tubular portion receiving opening of the circuit board; and a length of the tubular portion receiving opening of the circuit board measured in the longitudinal direction of the tubular portion receiving opening is defined as follows:

$$X>(R^2-A^2)^{1/2}+W/2+D$$

where "X" denotes the length of the tubular portion receiving opening;

"R" denotes an outer radius of the sensor plate;

"A" denotes a minimum distance between the rotational axis of the output shaft and any one of the rotation sensors;

"W" denotes a width of each rotation sensor measured between the two long sides of each rotation sensor; and "D" denotes an outer diameter of the base end of the tubular portion.

7. The electric motor according to claim 6, wherein:

each sensor receiving opening of the base plate is in a form of a generally rectangular through hole; and a length of the sensor receiving opening of the base plate measured in a longitudinal direction of the sensor receiving opening is defined as follows:

$$Y>(R^2-A^2)^{1/2}+3\times W/2$$

where "Y" denotes the length of the sensor receiving opening.

8. The electric motor according to claim 2, wherein the stator base further includes a frame wall, which is formed along an outer peripheral edge of the base plate on the second side of the base plate and extends in a direction generally parallel to the axial direction of the output shaft to surround the sensor plate and the at least one rotation sensor.

9. The electric motor according to claim 8, further comprising a cover that contacts an axial distal end of the frame wall, which is opposite from the base plate.

10. The electric motor according to claim 8, wherein:

the at least one rotation sensor includes first to third rotation sensors, wherein an angular interval between the first rotation sensor and the second rotation sensor is about 180 degrees, and an angular interval between the third rotation sensor and each of the first and second rotation sensors is about 90 degrees;

the at least one sensor receiving opening of the base plate includes first to third sensor receiving openings;

the first and second sensor receiving openings receive the first and second rotation sensors, respectively;

each of the first and second sensor receiving openings is in a form of an elongated through hole, which penetrates through the base plate in the direction parallel to the axial direction of the output shaft and is spaced away from an outer peripheral edge of the base plate;

the third sensor receiving opening receives the third rotation sensor;

the third sensor receiving opening is in a form of an elongated recess, which penetrates through the base plate in the direction parallel to the axial direction of the output shaft and is recessed from the outer peripheral edge of the base plate toward the output shaft; and the frame wall has a lateral opening, which penetrates through the frame wall in a direction parallel to the longitudinal direction of the third sensor receiving opening and is communicated with the third sensor receiving opening.

11. The electric motor according to claim 10, wherein:

the stator base further includes an overhang, which is formed along an axial distal end of the frame wall that is opposite from the base plate, wherein the overhang extends generally in parallel with the base plate from the axial distal end of the frame wall in a direction away from the output shaft; and the overhang includes a bridge, which closes an axial end of the lateral opening that is opposite from the third sensor receiving opening.

12. The electric motor according to claim 1, wherein:

a base end of the tubular portion has a circular cross section; and the tubular portion receiving opening is in a form of through hole, which penetrates through the circuit board in the axial direction of the output shaft and has a single semicircular part and a straight part that are arranged in this order in a longitudinal direction of the tubular portion receiving opening.

13. The electric motor according to claim 1, wherein the tubular portion receiving opening of the circuit board is in a form of an elongated recess, which penetrates through the circuit board in the axial direction of the output shaft and is recessed from an outer peripheral edge of the circuit board.

14. The electric motor according to claim 1, further comprising a control means for controlling a rotational speed of the output shaft based on a signal outputted from the at least one rotation sensor.

15. The electric motor according to claim 14, wherein the control means is provided in the circuit board.

16. An electric motor comprising:

a rotor that is rotated upon energization of the electric motor;

an output shaft that is secured to the rotor to rotate integrally with the rotor;

a circular sensor plate that is secured to the output shaft to rotate integrally with the output shaft;

a circuit board that includes at least one rotation sensor, which outputs a signal that corresponds to a rotational speed of the sensor plate, wherein each rotation sensor includes two opposed arms, which are spaced from each other in a direction parallel to an axial direction of the output shaft and receives a portion of the sensor plate between the opposed arms; and a stator that has a base plate, which extends in a direction perpendicular to the axial direction of the output shaft, wherein the base plate includes:

at least one sensor receiving opening, which penetrates through the base plate from a first side to a second side of the base plate in a direction parallel to the axial direction of the output shaft to receive a corresponding one of the at least one rotation sensor; and a shaft hole, which penetrates through the base plate in the axial direction of the output shaft and rotatably receives the output shaft, wherein:

the circuit board is located on the first side of the base plate;

the sensor plate is located on the second side of the base plate; and each rotation sensor protrudes from the corresponding sensor receiving opening on the second side of the base plate to receive the portion of the sensor plate between the opposed arms of the rotation sensor.

17. A manufacturing method of an electric motor, the method comprising:

installing an output shaft, to which a circular sensor plate is secured, into a shaft hole of a tubular portion of a stator base;

axially installing a circuit board, which has at least one rotation sensor and an elongated tubular portion receiving opening, to the stator base in an axial direction of the output shaft, so that the tubular portion of the stator base is received in the tubular portion receiving opening of the circuit board, and the circuit board is positioned in a non-interfering position; and moving the circuit board to an installation position toward the output shaft in an imaginary plane perpendicular to the axial direction of the output shaft, so that a portion of the sensor plate is received between two opposed arms of each of the at least one rotation sensor.

18. The method according to claim 17, wherein:

the axially installing of the circuit board includes installing of the circuit board on a first side of a base plate of the stator base, which extends from a base end of the tubular portion in a direction perpendicular to the axial direction of the output shaft; and the installing of the output shaft into the shaft hole of the tubular portion includes installing of the output shaft into the shaft hole of the tubular portion on a second side of the base plate, which is opposite from the first side of the base plate in the axial direction of the output shaft.

19. The method according to claim 18, wherein the axially installing of the circuit board further includes installing of each of the at least one rotation sensor into a corresponding one of at least one elongated sensor receiving opening of the base plate.

20. The method according to claim 19, wherein:

the at least one rotation sensor includes a plurality of rotation sensors; and the at least one sensor receiving opening of the base plate includes a plurality of rotation sensors.

* * * * *